(12) United States Patent
Hirao et al.

(10) Patent No.: US 8,363,339 B2
(45) Date of Patent: *Jan. 29, 2013

(54) IMAGING LENS, IMAGING DEVICE, PORTABLE TERMINAL, AND METHOD FOR MANUFACTURING IMAGING LENS

(75) Inventors: Yusuke Hirao, Sakai (JP); Keiji Matsusaka, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 558 days.

This patent is subject to a terminal disclaimer.

(21) Appl. No.: 12/526,073

(22) PCT Filed: Feb. 19, 2008

(86) PCT No.: PCT/JP2008/052764
§ 371 (c)(1),
(2), (4) Date: Aug. 6, 2009

(87) PCT Pub. No.: WO2008/102776
PCT Pub. Date: Aug. 28, 2008

(65) Prior Publication Data
US 2011/0001865 A1    Jan. 6, 2011

(30) Foreign Application Priority Data

Feb. 19, 2007 (JP) ................................ 2007-038221
Jul. 4, 2007 (JP) ................................ 2007-176621

(51) Int. Cl.
*G02B 9/00* (2006.01)
(52) U.S. Cl. .................... 359/797; 359/796; 359/694
(58) Field of Classification Search ................ 359/797, 359/796
See application file for complete search history.

(56) References Cited

U.S. PATENT DOCUMENTS

| 2005/0254147 A1* | 11/2005 | Wang et al. ................ 359/717 |
| 2006/0262416 A1 | 11/2006 | Lee et al. ................ 359/645 |
| 2006/0285229 A1 | 12/2006 | Ogawa ................ 359/754 |
| 2007/0221826 A1* | 9/2007 | Bechtel et al. ........... 250/208.1 |
| 2007/0275505 A1 | 11/2007 | Wolterink |

FOREIGN PATENT DOCUMENTS

| EP | 2 037 304 A1 | 3/2009 |
| JP | 2004-312239 A | 11/2004 |
| JP | 2005-539276 | 12/2005 |
| JP | 2006-323365 A | 11/2006 |
| JP | 2006-349948 A | 12/2006 |
| JP | 3929479 B1 | 6/2007 |
| JP | 3946245 B1 | 7/2007 |
| WO | WO 2004/027880 | 4/2004 |
| WO | WO 2008/011003 | 1/2008 |
| WO | WO 2008/102776 A1 | 8/2008 |

OTHER PUBLICATIONS

European Search Report dated Feb. 6, 2012 in the corresponding European patent application, No. EP 08 71 1585. Office Action issued on Aug. 28, 2012 in the corresponding Japanese application, No. 2009-500194.

* cited by examiner

*Primary Examiner* — James Jones
(74) *Attorney, Agent, or Firm* — Cozen O'Connor

(57) ABSTRACT

An imaging lens (LN) includes at least one lens block (BK), and an aperture stop (ape). The lens block (BK) includes a plane-parallel lens substrate (LS) and a lens (L) formed of different materials. In the imaging lens (LN), a first lens block (BK1) disposed at the most object-side exerts a positive optical power, and said at least one lens block is contiguous only with one of the object-side and image-side substrate surfaces of the lens substrate (LS).

19 Claims, 14 Drawing Sheets

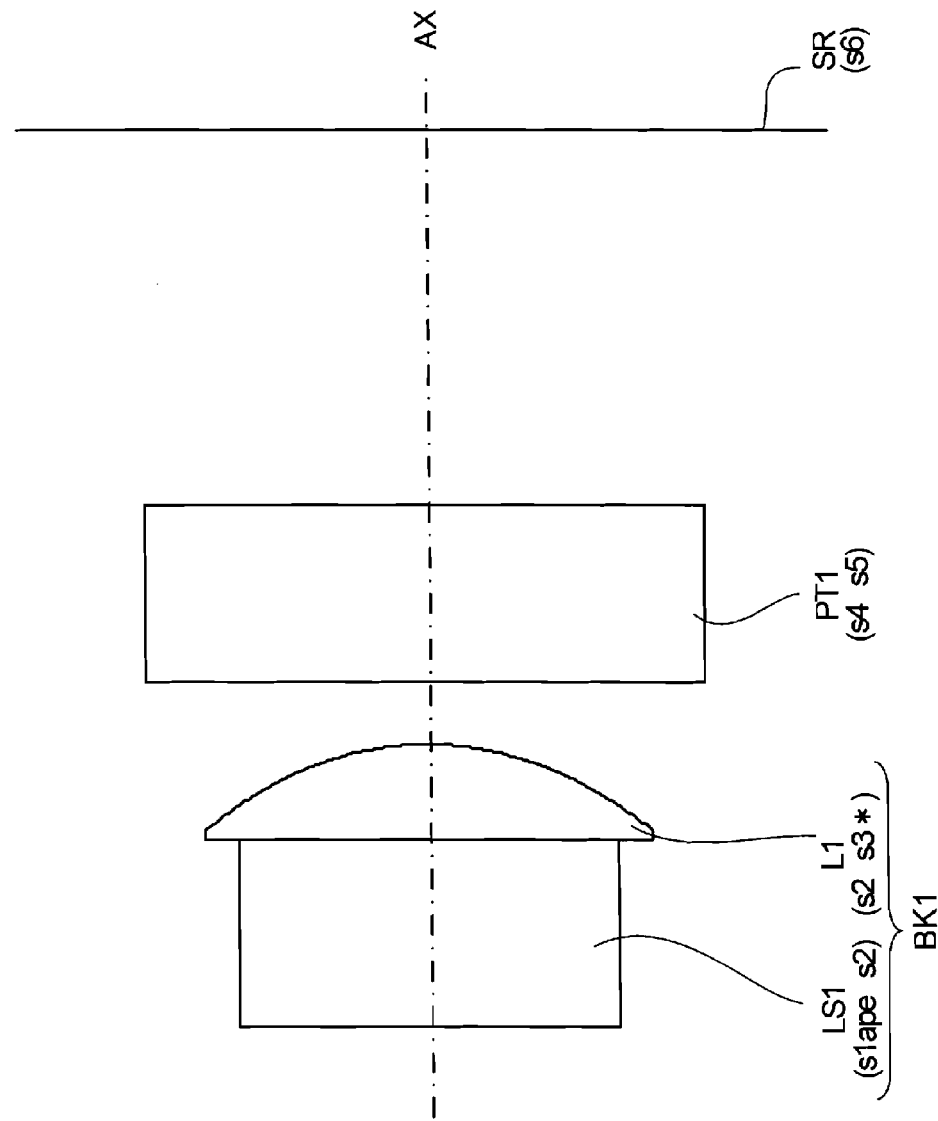

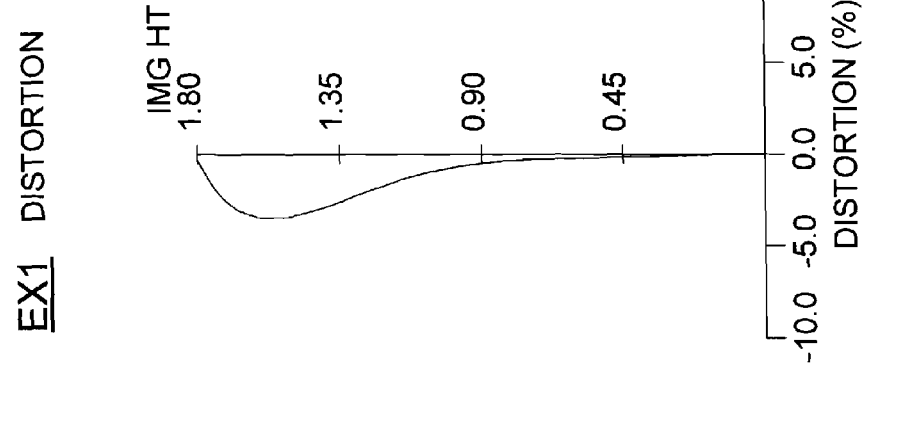
FIG.6C EX1 DISTORTION
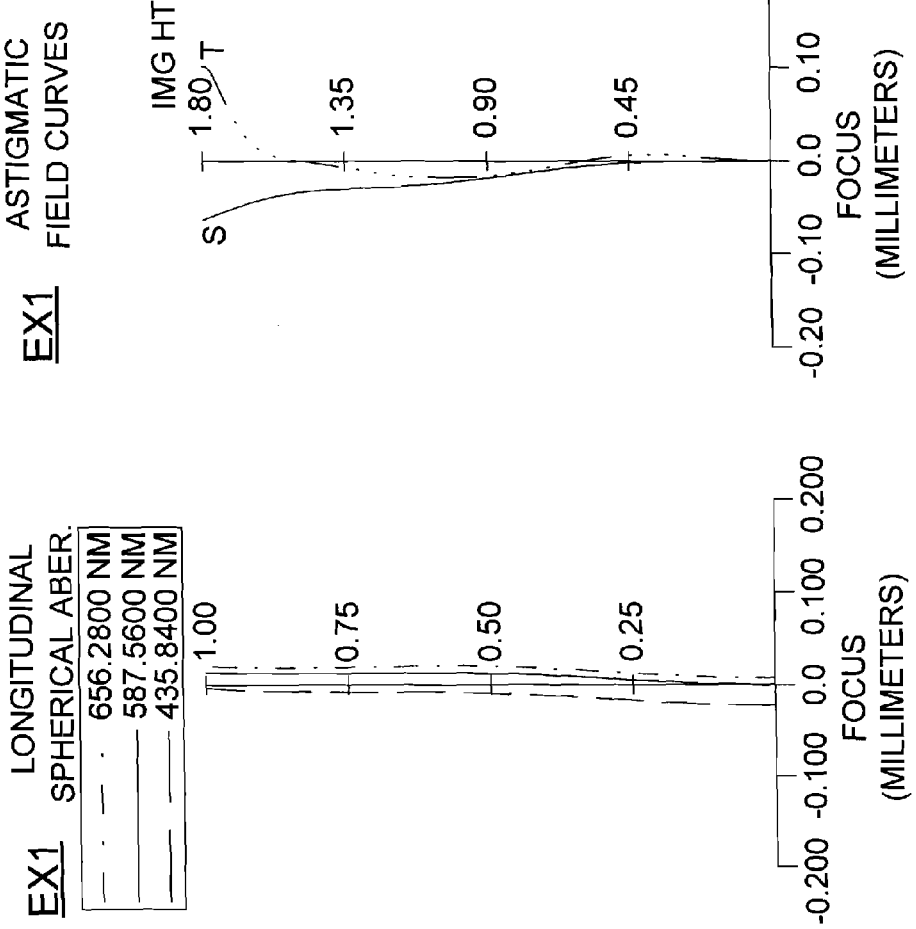
FIG.6B EX1 ASTIGMATIC FIELD CURVES
FIG.6A EX1 LONGITUDINAL SPHERICAL ABER.

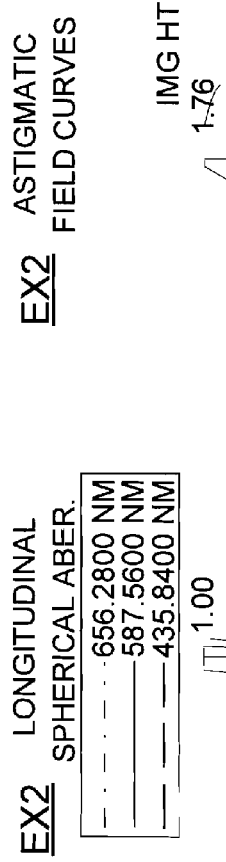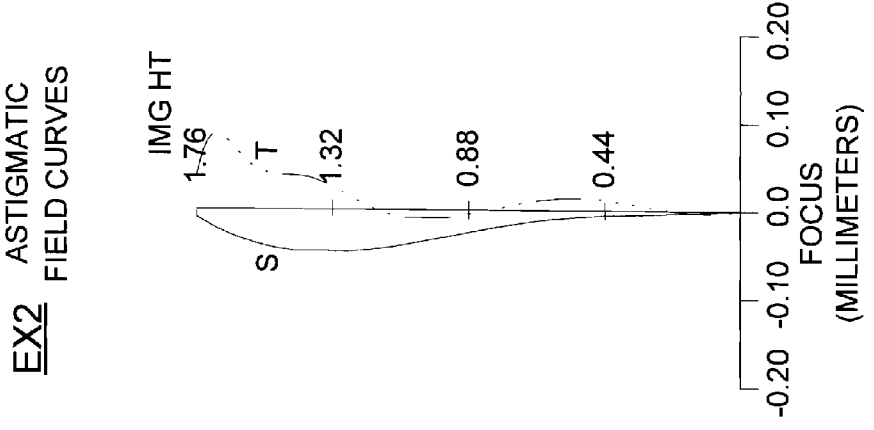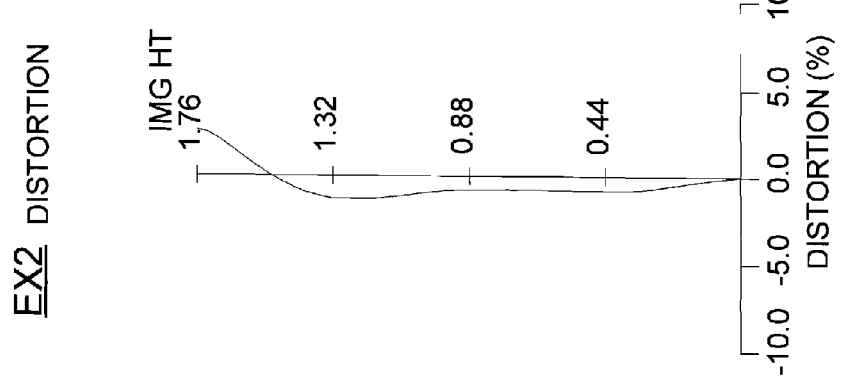

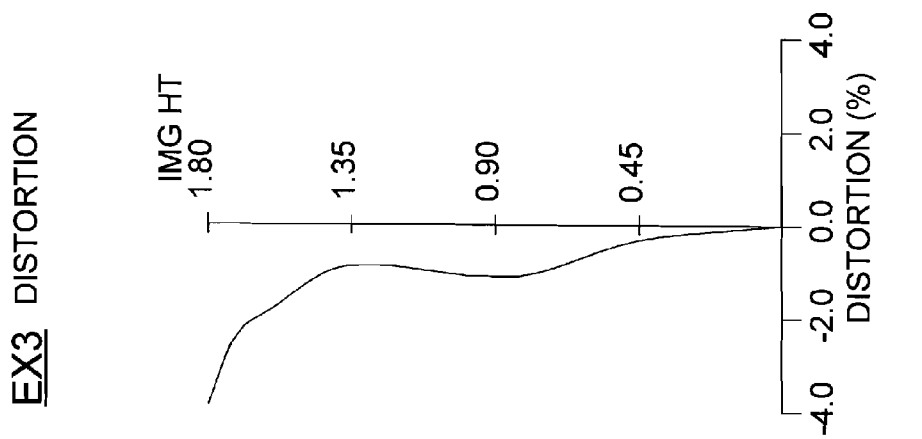
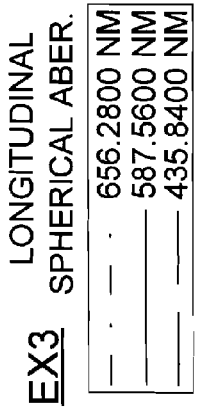
FIG. 8A  EX3 LONGITUDINAL SPHERICAL ABER.
FIG. 8B  EX3 ASTIGMATIC FIELD CURVES
FIG. 8C  EX3 DISTORTION

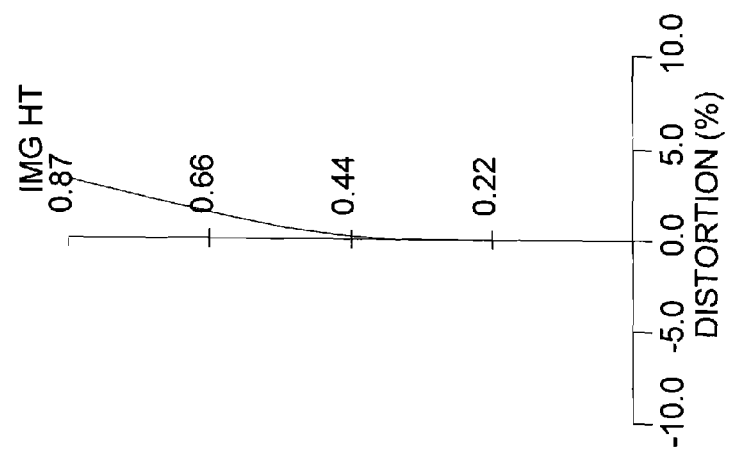
FIG.9A EX4 LONGITUDINAL SPHERICAL ABER.
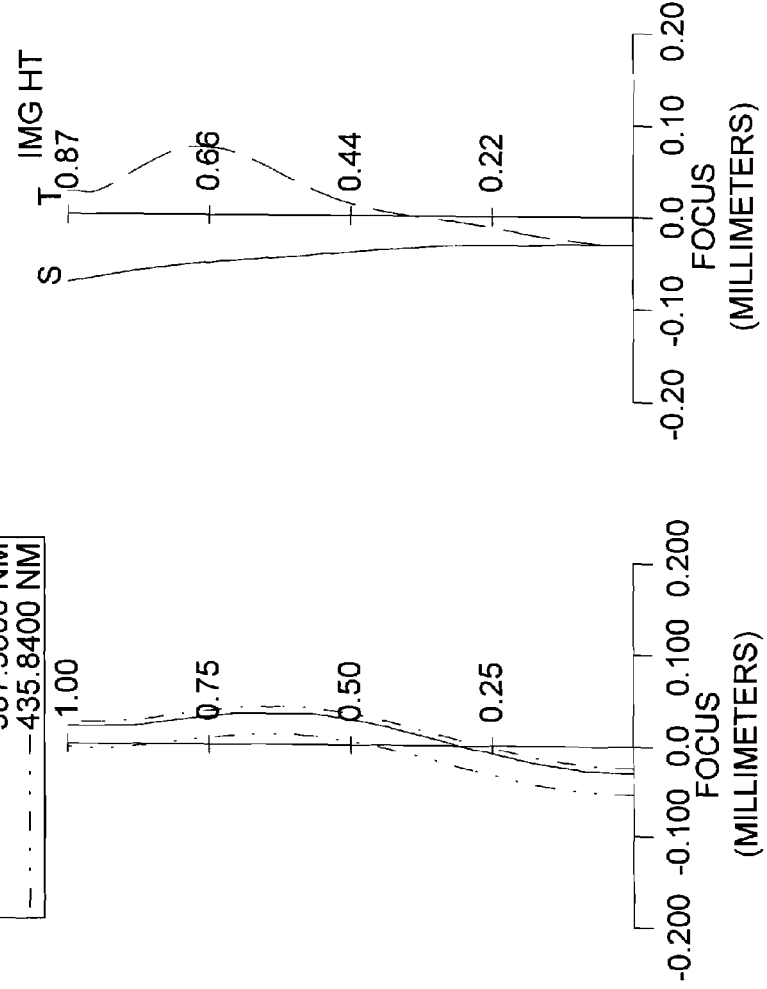
FIG.9B EX4 ASTIGMATIC FIELD CURVES
FIG.9C EX4 DISTORTION

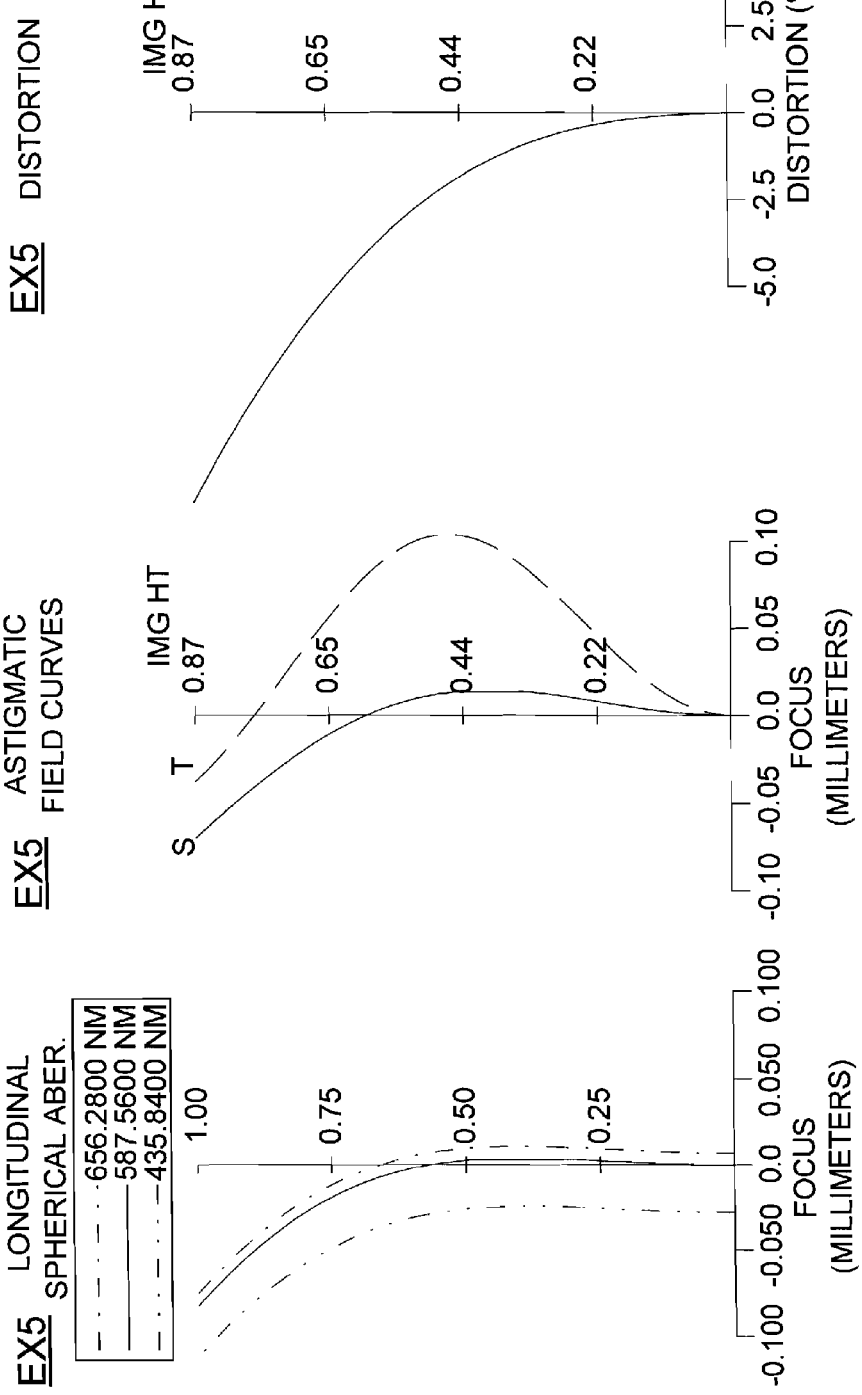

IMAGING LENS, IMAGING DEVICE, PORTABLE TERMINAL, AND METHOD FOR MANUFACTURING IMAGING LENS

RELATED APPLICATIONS

This application is a U.S. National Phase Application under 35 U.S.C. §371 of International Application PCT/JP2008/052764, filed Feb. 19, 2008, which claims priority from Japanese Patent Application No. 2007-038221 filed on Feb. 19, 2007 and Japanese Patent Application No. 2007-176621 filed on Jul. 4, 2007.

TECHNICAL FIELD

The present invention relates to an imaging lens, an imaging device, a portable terminal, and a method for manufacturing an imaging lens.

BACKGROUND ART

These days, compact, slim imaging devices are incorporated in compact, slim electronic appliances called portable terminals (for example, cellular phones, PDAs (personal digital assistants), etc.). Between such a portable terminal and, for example, an electronic appliance at a remote location, information such as sound information and image information is transferred bidirectionally.

Image sensors used in imaging devices are, for example, solid-state image sensors such as CCD (charge-coupled device) image sensors and CMOS (complementary metal-oxide semiconductor) image sensors. Nowadays, as imaging lenses for forming a subject image on those image sensors, lenses made of resin are used that can be mass-produced inexpensively and that thus contribute to cost reduction.

As such imaging lenses, in particular as imaging lenses used in imaging devices (so-called camera modules) incorporated in portable terminals, there are widely known those comprising three plastic lenses and those comprising one glass lens and two plastic lenses. Inconveniently, however, these imaging lenses do not promise easy compatibility between further size reduction and higher mass-producibility due to technical limitations.

As one measure to overcome this inconvenience, Patent Document 1 noted below deals with the replica method. The replica method is a method for forming a large number of lenses (lens elements) on a single lens substrate (wafer). A lens substrate (lens unit) including a plurality of lenses formed by this method arranged in an array is first joined to image sensors in the shape of a wafer (sensor wafer) and is then split. In the lens unit so split, the imaging lens corresponding to an imaging sensor is referred to as a wafer scale lens (cemented compound lens), and the module including the wafer scale lens and the imaging sensor is referred to as a wafer scale camera module.

Patent Document 1 discloses an imaging lens including a wafer scale lens (an optical element having a lens contiguous with at least one substrate surface of the lens substrate; also referred to as a lens block) formed by the replica method. Incidentally, in the wafer scale lens in this imaging lens, a diffractive surface and a refractive surface are formed simultaneously on a lens substrate, so that with those surfaces the imaging lens corrects chromatic aberration.

Patent Document 1: JP-A-2006-323365

DISCLOSURE OF THE INVENTION

Problems to be Solved by the Invention

However, forming a diffractive surface and a refractive surface simultaneously on a lens substrate, as in the imaging lens disclosed in Patent Document 1, is not easy. In particular, in a lens system with a comparatively short optical total length (the distance, in a lens system, from the most object-side incidence surface to the imaging surface of an imaging sensor), the refractive surface is extremely thin at its center, and this makes the formation of a wafer scale lens more difficult.

In an imaging lens including a diffractive surface, the diffraction efficiency with light of wavelengths other than the design wavelength tends to be low. In addition, if the diffractive surface has poor angular characteristics with the light incident on it, the angle of incidence of that light with respect to the diffractive surface is restricted, and thus the imaging lens cannot have a wide angle of view. In addition, in a case where, as in the imaging lens disclosed in Patent Document 1, a lens substrate has lenses on both its sides, those lenses need to be aligned with each other during assembly of the imaging lens, and the larger the number of lenses, the longer the time required for alignment.

Moreover, even such a wafer scale lens needs to have optical performance comparable with that of a conventional, normal lens system (normal lens) formed of glass or resin. In a case where a wafer scale lens needs to include a meniscus shape from the viewpoint of optical performance (for example, from the viewpoint of aberration correction), however, in order for the wafer scale lens to include a lens substrate, it needs to have an increased thickness along the optical axis. As a result, the wafer scale lens, and hence the imaging lens, tends to have an increased length.

Nowadays, a camera module, together with an IC chip, etc. is fitted on a printed circuit board having solder paste printed on it, and is then heated (for reflow soldering); thereby the module is mounted on it. Such mounting allows inexpensive mass-production of various devices including the camera module. Thus, recent imaging lenses need to be sufficiently heat-resistant to withstand reflow soldering.

The present invention has been made in view of the foregoing, and an object of the present invention is to provide an imaging lens etc. that help
reduce the optical total length relative to the image height without including a diffractive surface or the like, despite including fewer lens blocks;
achieve satisfactory aberration correction; and
reduce costs.

Means for Solving the Problem

An imaging lens includes at least one lens block having: a lens substrate that is a plane-parallel plate; and a lens that is contiguous with at least one of the object-side and image-side substrate surfaces of the lens substrate and that exerts a positive or negative optical power. The imaging lens also includes an aperture stop that restricts light amount.

The lens blocks included in this imaging lens are given numbers, namely first to fourth, according to their place in order as counted from the object side to the image side. The lens substrates included in these lens blocks are given numbers, namely first to fourth, likewise. The lenses L in the lens blocks are each referred to as the lens L on the object side (o)

or image side (i) of a given lens substrate LS (one of the first to fourth lens substrates LS1 to LS4), specifically the lens L[LS1$o$], the lens L[Ls1$m$], the lens L[LS2$o$], the lens L[Ls2$m$], the lens L[LS3$o$], the lens L[Ls3$m$], the lens L[LS4$o$], and the lens L[Ls4$m$].

Preferably, the imaging lens is constructed as follows: in each of the lens blocks, the lens included therein is formed out of a material different from the material out of which the lens substrate is formed, and the first lens block is disposed at the most object-side position and exerts a positive optical power. At least one lens block included in the imaging lens includes the lens only contiguous with the object-side or image-side substrate surface of the lens substrate.

In the imaging lens, preferably, conditional formula (D1) below is fulfilled.

$$0.6 \leq f[BK1]/f[\text{all}] \leq 2.0 \qquad (D1)$$

where
f[BK1] represents the focal length of the first lens block; and
f[all] represents the focal length of the entire imaging lens.

In the imaging lens, preferably, the first lens block includes, as a lens substrate, a first lens substrate and, as a lens, a lens L[LS1$o$] contiguous with the object-side substrate surface of the first lens substrate, an object-side surface of the lens L[LS1$o$] being convex to the object side. Moreover, the imaging lens preferably fulfills conditional formula (D2) below.

$$1 < N[LS1]/N[L[LS1o]]. \qquad (D2)$$

where
N[LS1] represents the index of refraction of the first lens substrate; and
N[L[LS1$o$]] represents the index of refraction of the lens L[LS1$o$].

In the imaging lens, preferably, the first lens block includes, as a lens substrate, a first lens substrate and, as a lens, a lens L[LS1$o$] contiguous with the object-side substrate surface of the first lens substrate, the object-side lens surface of the lens L[LS1$o$] being convex to the object side. Moreover, the imaging lens preferably fulfills conditional formula (D3) below.

$$1 < v[L[LSo]]/v[LS1] \qquad (D3)$$

where
v[LS1] represents the Abbe number of the first lens substrate; and
v[L[LS1$o$]] represents the Abbe number of the lens L[LS1$o$].

In addition, the imaging lens preferably fulfills conditional formula (D4) below.

$$0.03 \leq d[LS1]/TL \leq 0.33 \qquad (D4)$$

where
d[LS1] represents the thickness of the first lens substrate along the optical axis; and
TL represents the distance from the most object-side surface in the imaging lens to the imaging surface along the optical axis.

In the imaging lens, preferably, the lens block includes at least one lens block in which, as a lens, lenses are contiguous with both the object-side and image-side substrates of the lens substrate, and conditional formula below is fulfilled.

$$10 < |v[L[LSo]] - v[L[LSm]]| \qquad (D5)$$

where
v[L[LSo]] represents, in the lens block in which lenses are contiguous with both the object-side and image-side substrate surfaces of the lens substrate, the Abbe number of the lens contiguous with the object-side substrate surface; and
v[L[LSm]] represents, in the lens block in which lenses are contiguous with both the object-side and image-side substrate surfaces of the lens substrate, the Abbe number of the lens contiguous with the image-side substrate surface.

In the imaging lens, preferably, the first lens block includes, as a lens substrate, a first lens substrate and, as a lens, a lens L[LS1$o$] contiguous with the object-side substrate surface of the first lens substrate. Moreover, preferably, the imaging lens fulfills conditional formula (D6) below.

$$0 \leq DT[LS1o\text{-ape}]/d[LS1] \leq 1 \qquad (D6)$$

where
DT[LS1$o$–ape] represents the distance from the most object-side substrate surface of the first lens substrate to the aperture stop surface; and
d[LS1] represents the thickness of the first lens substrate along the optical axis.

In the imaging lens including the lens L[LS1$o$] whose object-side lens surface is convex to the object side, preferably, the aperture stop is a light-shielding film and is formed on the object-side or image-side substrate surface of the first lens substrate, and conditional formula (D7) below is fulfilled.

$$d[\text{ape}] < 25 \qquad (D7)$$

where
d[ape] represents the thickness of the aperture stop along the optical axis (in unit of μm).

Preferably, the aperture stop is a light-shielding film and is formed on the object-side substrate surface of the first lens substrate.

Preferably, the imaging lens is constructed as follows: the lens block includes the first lens block alone, and the first lens block includes, as a lens substrate, a first lens substrate and, as a lens, only a lens L[LS1$m$] contiguous with the image-side substrate surface of the first lens substrate. The aperture stop, the first lens substrate, and the lens L[LS1$m$] are arranged in this order from the object side to the image side, and the image-side lens surface of the lens L[LS1$m$] is convex to the image side.

In the imaging lens including the first lens block alone, preferably, conditional formula (D4) below is fulfilled.

$$0.03 \leq d[LS1]/TL \leq 0.33 \qquad (D4)$$

where
d[LS1] represents the thickness of the first lens substrate along the optical axis; and
TL represents the distance from the most object-side surface in the imaging lens to the imaging surface.

Preferably, the imaging lens including at least two lens blocks, namely the first lens block and a second lens block is constructed as follows: the first lens block includes, as a lens substrate, a first lens substrate and, as a lens, a lens L[LS1$o$] contiguous with the object-side substrate surface of the first lens substrate, the object-side lens surface of the lens L[LS1$o$] being convex to the object side.

In addition, the second lens block is located to the image side of the first lens block and includes, as a lens substrate, a second lens substrate and, as a lens, a lens L[LS2$o$] contiguous with the object-side substrate surface of the second lens substrate, the object-side lens surface of the lens L[LS2$o$] being concave to the object side.

In the imaging lens, preferably, the lens block includes only the first and second lens blocks and is further preferably constructed as follows: the first lens block includes, as a lens, a lens L[LS1m] contiguous with the image-side substrate surface of the first lens substrate, and in the first lens block, the lens L[LS1o], the first lens substrate, and the lens L[LS1m] are arranged in this order from the object side to the image side. In the second lens block, the lens L[LS2o] and the second lens substrate are arranged in this order from the object side to the image side.

Preferably, the object-side lens surface of the lens L[LS1o] is convex to the object side, the image-side lens surface of the lens L[LS1m] is convex to the image side, and the object-side lens surface of the lens L[LS2o] is concave to the object side.

Preferably, the imaging lens including at least two lens blocks is constructed as follows: the first lens block includes, as a lens substrate, a first lens substrate and, as a lens, a lens L[LS1m] contiguous with the image-side substrate surface of the first lens substrate, the image-lens surface of the lens L[LS1m] being concave to the image side.

Preferably, the imaging lens includes, as a lens block, only the first lens block and a second lens block and is further preferably constructed as follows: the first lens block further includes, as a lens, a lens L[LS1o] contiguous with the object-side substrate surface of the first lens substrate, and in the first lens block, the lens L[LS1o], the first lens substrate, and the lens L[LS1m] are arranged in this order from the object side to the image side.

The second lens block is located to the image side of the first lens block and includes, as a lens substrate, a second lens substrate and, as a lens, a lens L[LS2o] contiguous with the object-side substrate surface of the second lens substrate, and in the second lens block, the lens L[LS2o] and the second lens substrate are arranged in this order from the object side to the image side.

In addition, preferably, the object-side lens surface of the lens L[LS1o] is convex to the object side, the image-side lens surface of the lens L[LS1m] is concave to the image side, and the object-side lens surface of the lens L[LS2o] is concave to the object side.

Preferably, the imaging lens fulfills conditional formula (D8) below.

$$Ar/TL \leq 0.5 \tag{D8}$$

where
  Ar represents the sum of aerial distances between adjacent lens blocks in the imaging lens (including the thickness of any optical element having no optical power other than a lens block, as given as an equivalent thickness in air); and
  TL represents the distance from the most object-side surface in the imaging lens to the imaging surface along the optical axis.

Preferably, the imaging lens including only three lens blocks, namely the first lens block, a second lens block, and a third lens block is constructed as follows: in the first lens block, the lens L[LS1o], the first lens substrate, and the lens L[LS1m] are arranged in this order from the object side to the image side.

The second lens block is located to the image side of the first lens block and includes, as a lens substrate, a second lens substrate and, as a lens, a lens L[LS2o] contiguous with the object-side substrate surface of the second lens substrate. Moreover, the lens L[LS2o] and the second lens substrate are arranged in this order from the object side to the image side.

The third lens block is locate to the image side of the second lens block and includes, as a lens substrate, a third lens substrate and, as a lens, a lens L[LS3o] contiguous with the second lens substrate and a lens L[LS3m] contiguous with the image-side substrate surface of the third lens substrate. Moreover, the lens L[LS3o], the third lens substrate, and the lens L[LS3m] are arranged in this order from the object side to the image side.

In addition, the object-side lens surface of the lens L[LS1o] is convex to the object side, and the image-side lens surface of the lens L[LS1m] is concave to the image side. Moreover, the object-side lens surface of the lens L[LS2o] is concave to the object side. Furthermore, the object-side lens surface of the lens L[LS3o] and the image-side lens surface of the lens L[LS3m] are aspherical.

Preferably, the imaging lens including only four lens blocks, namely the first lens block, a second lens block, a third lens block, and a fourth lens block is constructed as follows: in the first lens block, a lens L[LS1o], a first lens substrate, and a lens L[LS1m] are arranged in this order from the object side to the image side.

The second lens block is located to the image side of the first lens block and includes, as a lens substrate, a second lens substrate and, as a lens, a lens L[LS2o] contiguous with the object-side substrate surface of the second lens substrate and a lens L[LS2m] contiguous with the image-side substrate surface of the second lens substrate. Moreover, the lens L[LS2o], the second lens substrate, and the lens L[LS2m] are arranged in this order from the object side to the image side.

The third lens block is located to the image side of the second lens block and includes, as a lens substrate, a third lens substrate and, as a lens, a lens L[LS3m] contiguous with the image-side substrate surface of the third lens substrate. Moreover, the third lens substrate and the lens L[LS3m] are arranged in this order from the object side to the image side.

The fourth lens block is located to the image side of the third lens block and includes, as a lens substrate, a fourth lens substrate and, as a lens, a lens L[LS4o] contiguous with the object-side substrate surface of the fourth lens substrate and a lens L[LS4m] contiguous with the image-side substrate surface of the fourth lens substrate. Moreover, the lens L[LS4o], the fourth lens substrate, and the lens L[LS4m] are arranged in this order from the object side to the image side.

In addition, the object-side lens surface of the lens L[LS1o] is convex to the object side, and the image-side lens surface of the lens L[LS1m] is concave to the image side. Moreover, the object-side lens surface of the lens L[LS2o] is concave to the object side. The image-side lens surface of the lens L[LS3m] is aspherical. The object-side lens surface of the lens L[LS4o] and the image-side lens surface of the lens L[LS4m] are aspherical.

In the imaging lens including only three lens blocks and in the imaging lens including only four lens blocks, preferably, conditional formulae (D9) and (D10) below are fulfilled.

$$TL/Y' \leq 2.06 \tag{D9}$$

$$Ar/TL \leq 0.6 \tag{D10}$$

where
  TL represents the distance from the most object-side surface in the imaging lens to the imaging surface along the optical axis;
  Y' represents the maximum image height; and
  Ar represents the sum of aerial distances between adjacent lens blocks in the imaging lens (including the thickness of any optical element having no optical power other than a lens block, as given as an equivalent thickness in air).

In the imaging lens, preferably, a lens substrates is formed out of glass.

In the imaging lens, preferably, a lens is formed out of resin.

Preferably, the resin of which a lens is formed has inorganic fine particles with a particle diameter of 30 nm or less dispersed therein.

Preferably, the resin is a hardening resin.

It can be said that the present invention also covers an imaging device including: an imaging lens as described above; and an imaging sensor sensing the light passing through the imaging lens. The present invention also covers a portable terminal including such an imaging device.

A preferable method of manufacturing an imaging lens as described above includes, let a unit including, as a lens block, a plurality of lens blocks arranged in an array be called a lens unit block: a joining step of arranging a spacer at least at part of a peripheral edge of the lens blocks and joining the plurality of lens block units with the spacer in between; and a step of cutting the joined-together lens block units along the spacer.

ADVANTAGES OF THE INVENTION

According to the present invention, an imaging lens includes at least one lens block, and the lens block disposed at the most object-side position exerts a positive optical power. In at least one lens block in this imaging lens, only with either the object-side or image-side substrate surface of the lens substrate there, a lens is contiguous. Thus, aberrations attributable to lens eccentricity are less likely (in short, the imaging lens has satisfactory aberration correction performance). This makes the manufacture of the imaging lens easy with the result that the imaging lens is manufactured inexpensively.

In addition, a reduced number of lenses included in a lens block means a reduced number of molds needed for them, leading to a great cost reduction. Moreover, in a case where lens blocks need to be aligned with one another, a reduction, even by one, in the number of lenses helps greatly reduce the time required for alignment.

BRIEF DESCRIPTION OF DRAWINGS

FIG. 5 is an optical sectional diagram of an imaging lens of Example 5.

FIG. 6A is a spherical aberration diagram of the imaging lens of Example 1.

FIG. 6B is an astigmatism aberration diagram of the imaging lens of Example 1.

FIG. 6C is a distortion diagram of the imaging lens of Example 1.

FIG. 7A is a spherical aberration diagram of the imaging lens of Example 2.

FIG. 7B is an astigmatism aberration diagram of the imaging lens of Example 2.

FIG. 7C is a distortion diagram of the imaging lens of Example 2.

FIG. 8A is a spherical aberration diagram of the imaging lens of Example 3.

FIG. 8B is an astigmatism aberration diagram of the imaging lens of Example 3.

FIG. 8C is a distortion diagram of the imaging lens of Example 3.

FIG. 9A is a spherical aberration diagram of the imaging lens of Example 4.

FIG. 9B is an astigmatism aberration diagram of the imaging lens of Example 4.

FIG. 9C is a distortion diagram of the imaging lens of Example 4.

FIG. 10A is a spherical aberration diagram of the imaging lens of Example 5.

FIG. 10B is an astigmatism aberration diagram of the imaging lens of Example 5.

FIG. 10C is a distortion diagram of the imaging lens of Example 5.

LIST OF REFERENCE SYMBOLS

| | |
|---|---|
| BK | Lens block |
| L | Lens |
| LS | Lens surface |
| ape | Aperture stop |
| s | Lens surface or substrate surface |
| * | Aspherical surface |
| PT | Plane-parallel plate |
| LN | Imaging lens |
| SR | Imaging sensor |
| IM | Image surface (optical image) |
| SS | Light receiving surface |
| AX | Optical axis |
| LU | Imaging device |
| CU | Portable terminal |
| 1 | Signal processor |
| 2 | Controller |
| 3 | Memory |
| 4 | Operated portion |
| 5 | Display portion |

BEST MODE FOR CARRYING OUT THE INVENTION

Embodiment 1

Imaging Device and Portable Terminal

Typically, imaging lenses are suitably used in digital appliances (for example, portable terminals) equipped with an image capturing capability. This is because a digital appliance including a combination of an imaging lens, an image sensor, etc. functions as an imaging device that optically takes in an image of a subject and outputs it in the form of an electrical signal.

An imaging device is a main component (optical device) of a camera that shoots still and moving images of a subject, and includes, for example, from the object (i.e. subject) side thereof, an imaging lens that forms an optical image of an object and an image sensor that converts the optical image formed by the imaging lens into an electrical signal.

Examples of cameras include digital cameras, video cameras, monitoring cameras, vehicle-mounted cameras, and videophone cameras. Cameras may also be incorporated in, or externally fitted to, personal computers, portable terminals (for example, compact, portable information appliance terminals such as cellular phones and mobile computers), peripheral appliances (scanners, printers, etc.) for those, and other digital appliances.

As these examples suggest, incorporation of an imaging device is not limited to building of cameras; incorporation of an imaging device allows building of a variety of appliances equipped with camera capabilities, for example building of digital appliances equipped with an image capturing capability, such as camera phones.

Figure 11:
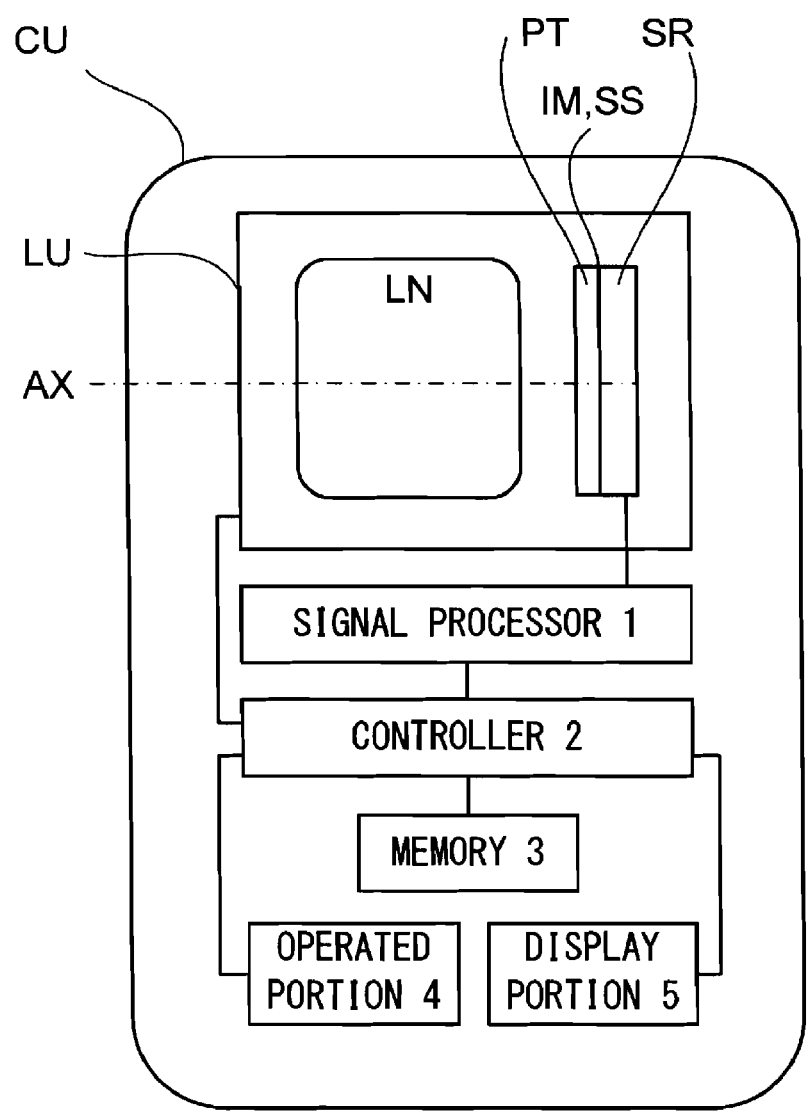
FIG. 11 is a block diagram of a portable terminal.

FIG. 11 is a block diagram of a portable terminal CU as one example of a digital appliance equipped with an image capturing capability. The portable terminal CU shown in this figure incorporates an imaging device LU, which includes an imaging lens LN, a plane-parallel plate PT, and an image sensor SR.

The imaging lens LN forms, from the object (i.e. subject) side thereof, an optical image (image surface) IM of an object. More specifically, the imaging lens LN includes, for example, a lens block BK (which will be described in detail later), and forms the optical image IM on a sensing surface SS of the image sensor SR.

Here, the optical image IM to be formed by the imaging lens LN passes through, for example, an optical low-pass filter (in FIG. 11, the plane-parallel plate PT) having a predetermined cut-off frequency characteristic determined by the pixel pitch of the image sensor SR. While passing there the optical image IM has its spatial frequency characteristic adjusted so as to minimize the so-called abasing noise occurring when it is converted into an electrical signal.

The adjustment of the spatial frequency characteristic here helps reduce color moiré. In cases where the performance expected around the resolution limit frequency is modest, however, no noise occurs even without use of an optical low-pass filter. Likewise, in cases where a user shoots or watches images by use of a display system (for example, the liquid crystal display of a cellular phone, etc.) on which noise is less noticeable, there is no need for an optical low-pass filter.

The plane-parallel plate PT is one or more optical filters, such as an optical low-pass filter and an infrared cut filter, that are arranged as necessary (the plane-parallel plate PT may correspond to the cover glass or the like of the image sensor SR).

The image sensor SR converts the optical image IM formed on the sensing surface SS by the imaging lens LN into an electrical signal. Used here is, for example, an image sensor (solid-state image sensor), such as a CCD (charge-coupled device) image sensor or CMOS (complementary metal-oxide semiconductor) image sensor. The imaging lens LN is so located as to form the optical image IM of the subject on the sensing surface SS of the image sensor SR. Thus, the optical image IM formed by the imaging lens LN is efficiently converted into an electrical signal by the image sensor SR.

When an imaging device LU like this is incorporated in a portable terminal CU equipped with an image capturing capability, the imaging device LU is typically arranged inside the body of the portable terminal CU. When the camera capabilities of the portable terminal CU are used, the imaging device LU is brought into a desired state. For example, an imaging device LU provided as a unit may be designed to be detachable from, or freely rotatable relative to, the main unit of a portable terminal CU.

The portable terminal CU includes, in addition to the imaging device LU, a signal processor 1, a controller 2, a memory 3, an operated portion 4, and a display portion 5.

The signal processor 1 subjects the signal generated by the image sensor SR to predetermined digital image processing and image compression processing as necessary. The so processed signal is then recorded, as a digital video signal, to the memory 3 (a semiconductor memory, optical disk, or the like), and/or is transferred to an external device across a cable or after being converted into an infrared signal.

The controller 2 is a microcomputer, and governs, in a concentrated fashion, functional control for shooting and playing back images, etc., more specifically for controlling a lens movement mechanism for focusing, etc. For example, the controller 2 controls the imaging device LU to shoot at least either a still or a moving image of the subject.

The memory 3 stores, for example, the signal generated by the image sensor SR and then processed by the signal processor 1.

The operated portion 4 includes operated members such as operation buttons (for example, a shutter-release button) and an operation dial (for example, an operation mode dial), and transmits the information entered by an operator to the controller 2.

The display portion 5 includes a display such as a liquid crystal monitor, and displays images by use of the image signal resulting from the conversion by the image sensor SR, or by use of image information recorded in the memory 3.

[Imaging Lens]

Figure 1:
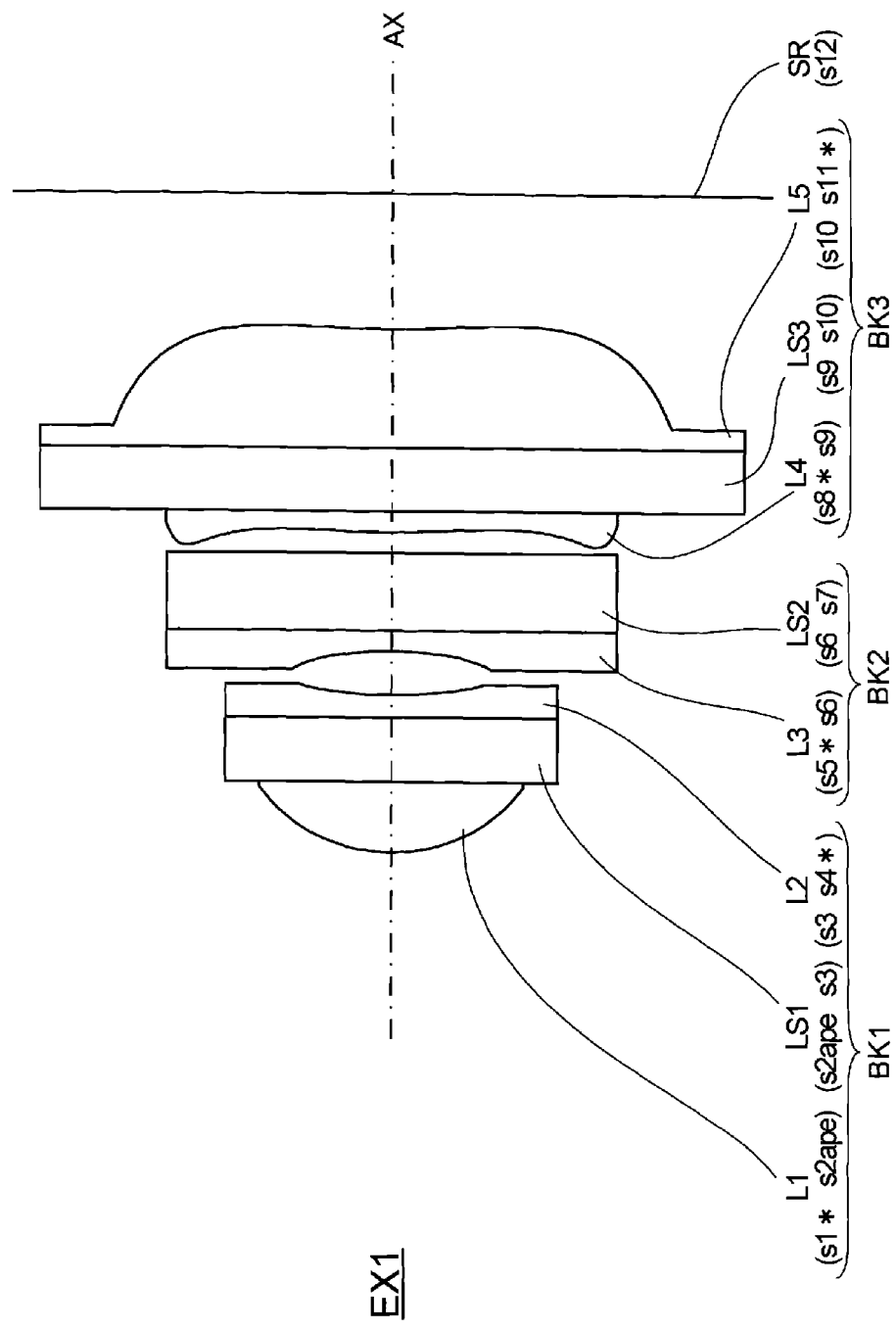
FIG. 1 is an optical sectional diagram of an imaging lens of Example 1.
Figure 2:
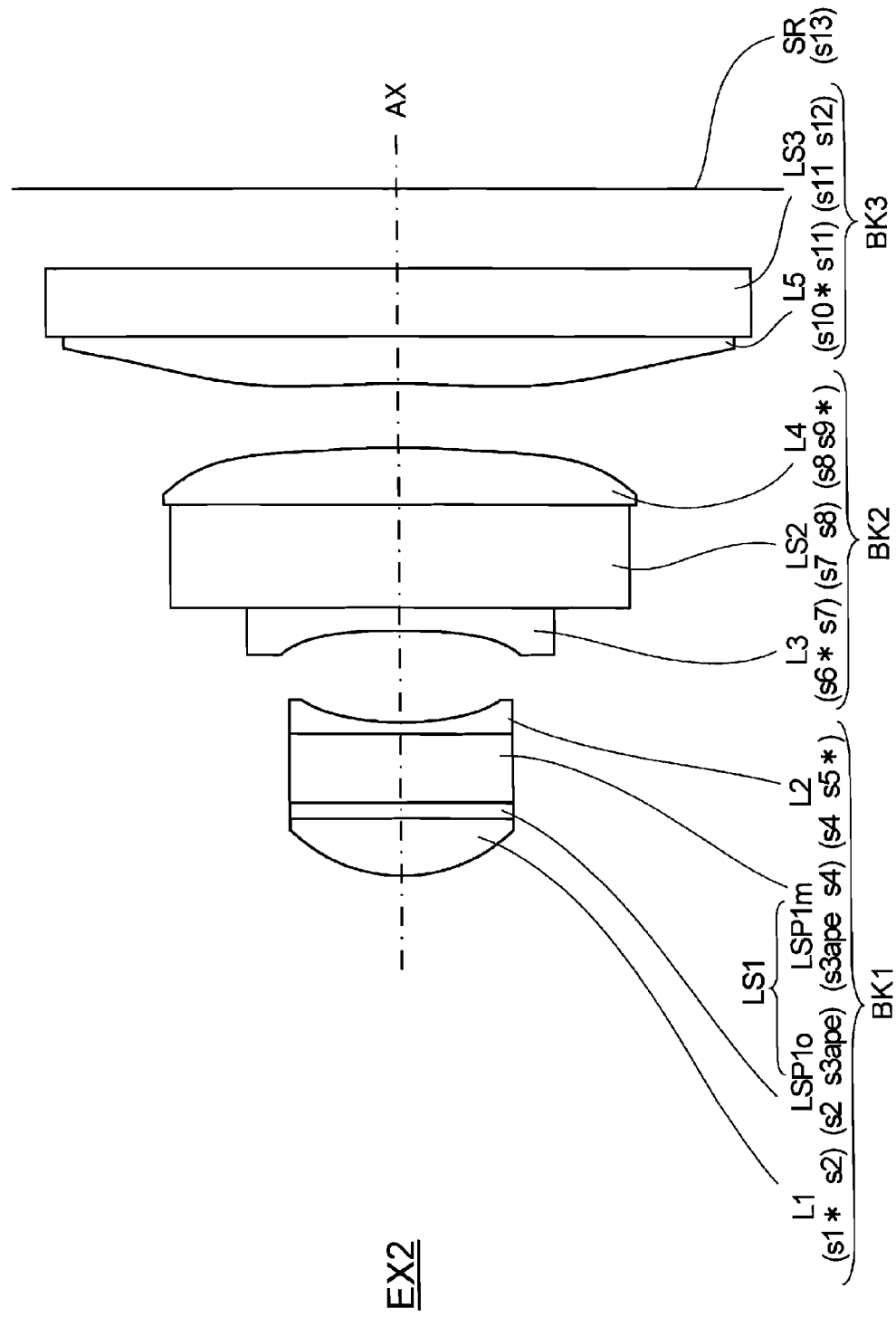
FIG. 2 is an optical sectional diagram of an imaging lens of Example 2.
Figure 3:
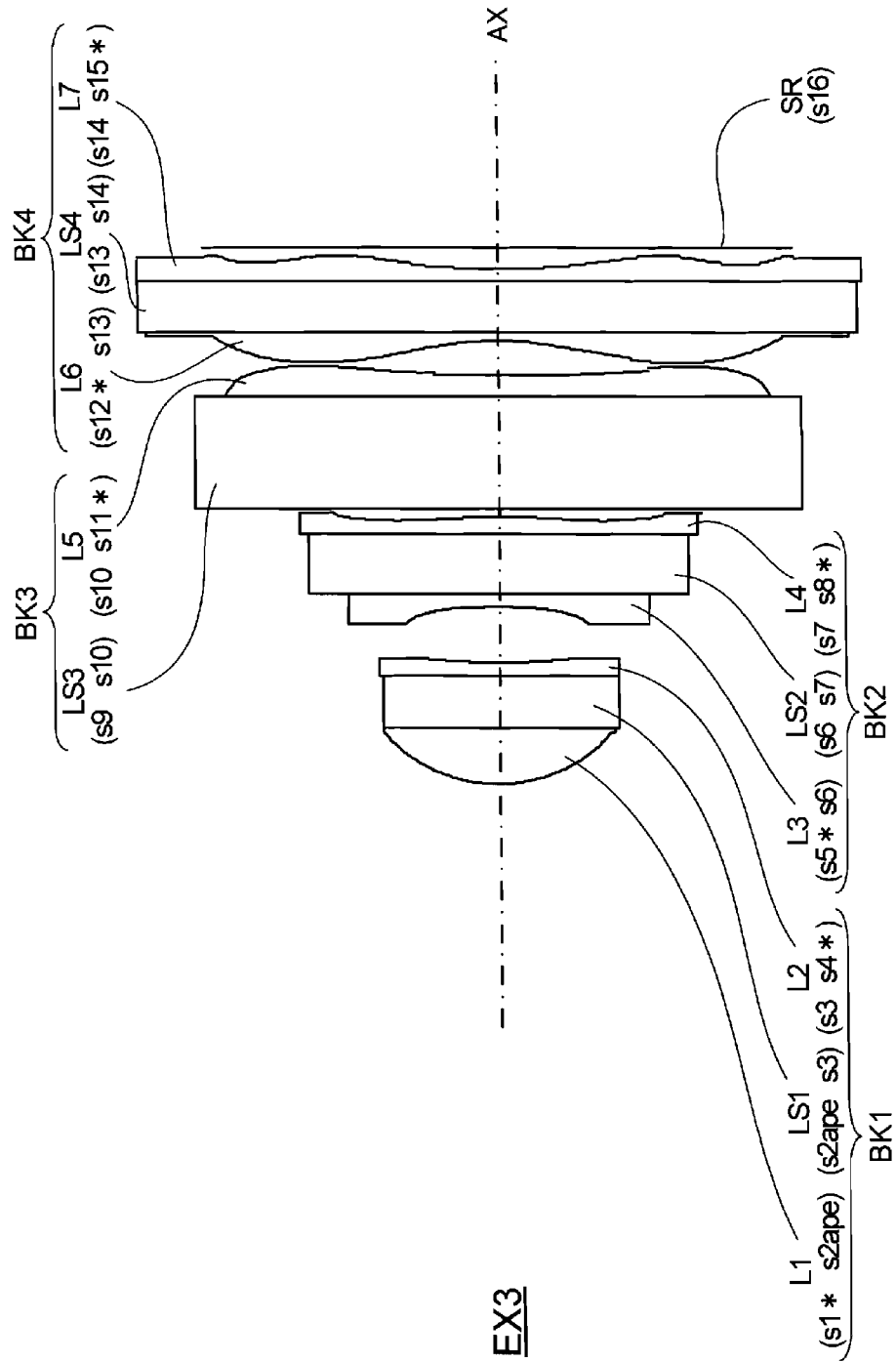
FIG. 3 is an optical sectional diagram of an imaging lens of Example 3.
Figure 4:
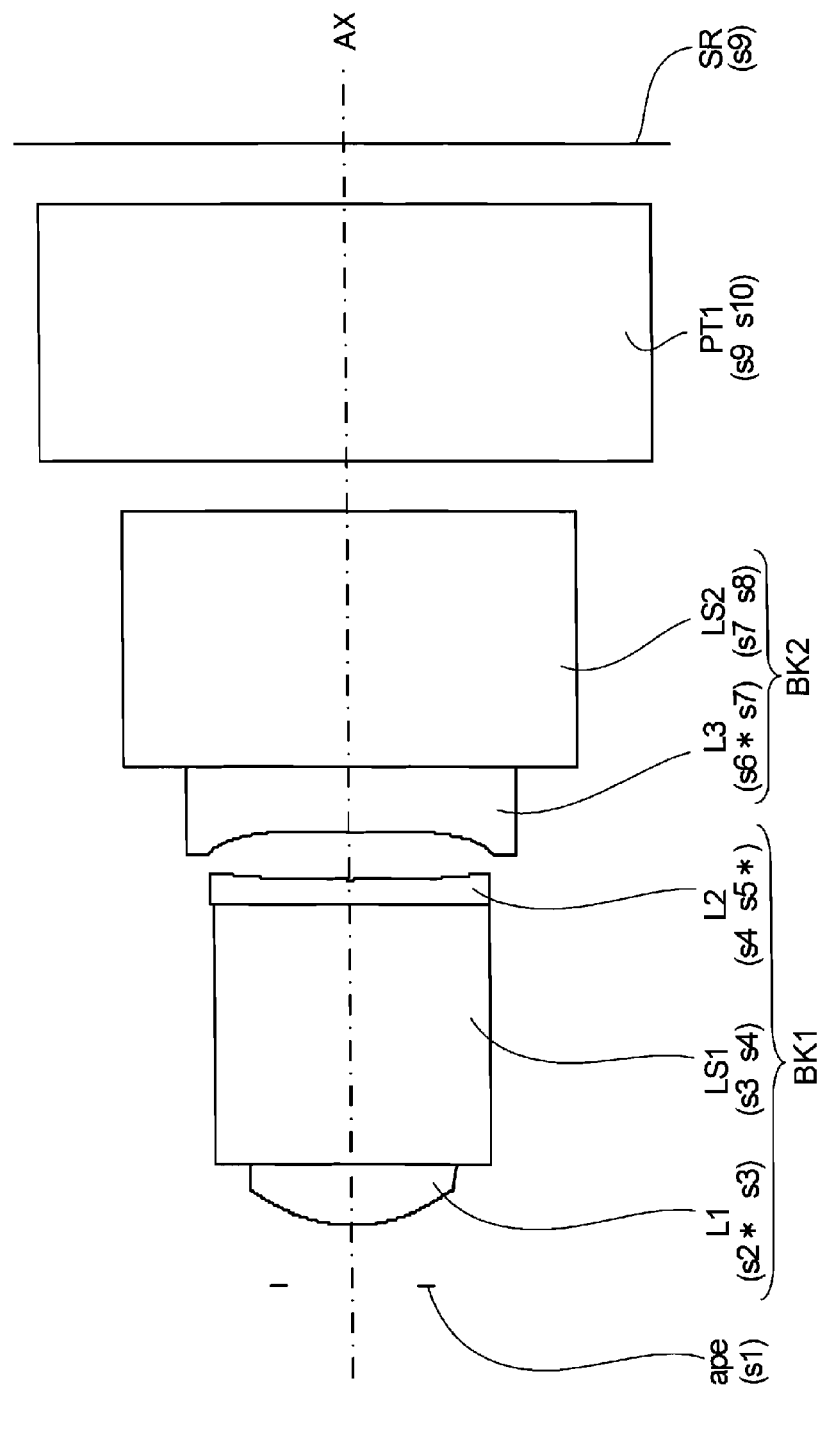
FIG. 4 is an optical sectional diagram of an imaging lens of Example 4.

Now, the imaging lens LN will be described in detail. The imaging lens LN includes a lens block BK having a plurality of optical elements that are contiguous with one another (see FIG. 1, which will be described later). This lens block (cemented compound lens) BK has a lens L contiguous with at least one of two opposite (object-side and image-side) substrate surfaces of a lens substrate LS (and the lens L exerts a positive or negative optical power).

Here, "contiguous with" denotes that the relevant substrate surface of the lens substrate LS and the lens L are directly bonded together, or are indirectly bonded together with another member in between.

[Manufacturing Method of the Imaging Lens]

Figure 12A:
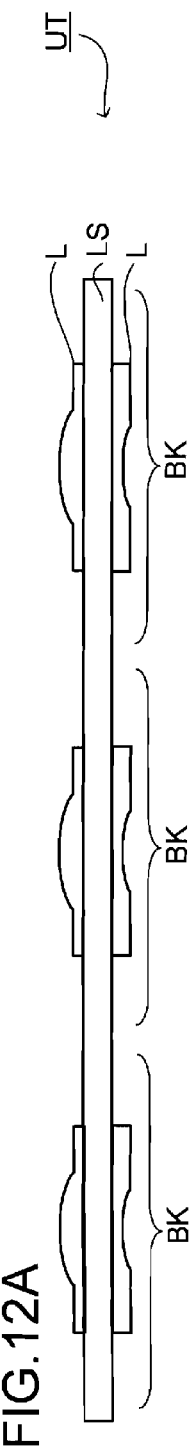
FIG. 12A is a sectional diagram of a lens block unit.

A lens block unit UT, like the one shown in a sectional view in FIG. 12A, including a plurality of lens blocks BK arranged in an array allows simultaneous fabrication of a large number of lenses L, and is manufactured inexpensively by the reflow method or by the replica method (a lens block unit UT may include one lens block BK, or may include a plurality of lens blocks BK).

According to the reflow method, a film of low-softening-point glass is formed on a glass substrate by CVD (chemical vapor deposition). The low-softening-point glass film so formed is then subjected to microprocessing by lithography and dry etching. It is then heated, so that the low-softening-point glass film melts into the shape of lenses. Thus, by the reflow method, a large number of lenses are fabricated simultaneously on a glass substrate.

On the other hand, according to the replica method, a hardening resin is molded into the shape of lenses by use of a mold and is transferred onto a lens wafer. Thus, by the replica method, a large number of lenses are fabricated simultaneously on a lens wafer.

Then, from lens block units UT manufactured by a method like those described above, the imaging lens LN is manufactured. An example of the manufacturing process of the imaging lens LN is shown in a schematic cross-sectional view in FIG. 12B.

A first lens block unit UT1 is composed of a first lens substrate LS1 in the form of a plane-parallel plate, a plurality of first lenses L1 bonded to one surface of the first lens substrate LS1, and a plurality of second lenses L2 bonded to the other surface of the first lens substrate LS1.

A second lens block unit UT2 is composed of a second lens substrate LS2 in the form of a plane-parallel plate, a plurality of third lenses L3 bonded to one surface of the second lens substrate LS2, and a plurality of fourth lenses L4 bonded to the other surface of the second lens substrate LS2.

A spacer member (spacer) B1 in the shape of a lattice is interposed between the first and second lens block units UT1 and UT2 (specifically, between the first and second lens substrates LS1 and LS2) to keep constant the interval between the two lens block units UT1 and UT2. Another spacer member B1 is interposed between a substrate 2 and the second lens block unit 2 to keep constant the interval between the substrate 2 and the lens block unit UT2 (thus the spacer members B1 can be said to form a two-tier lattice). The lenses L are located in the eyes of the lattice of the spacer members B1.

The substrate B2 is a sensor chip package of a wafer scale including a microlens array, or a plane-parallel plate (corresponding to the plane-parallel plate PT in FIG. 11) such as a sensor cover glass or IR-cut filter.

Owing to the spacer members B1 being interposed between the first lens block unit UT1 and the first lens block unit UT2 and between the second lens block unit UT2 and the second substrate B2, the lens substrates LS (the first and second lens substrates LS1 and LS2) are sealed together to be integrated into a unit.

Figure 12B:
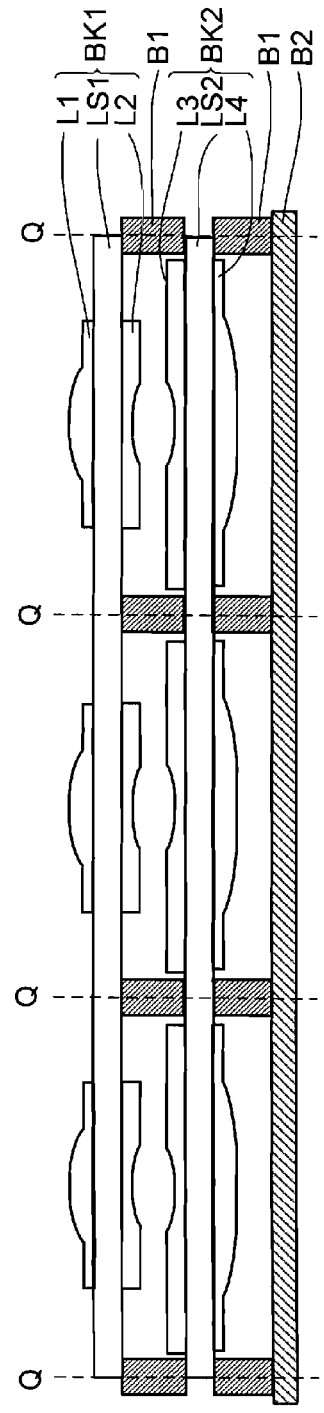
FIG. 12B is a sectional diagram showing a process of fabricating an imaging lens.
Figure 12C:
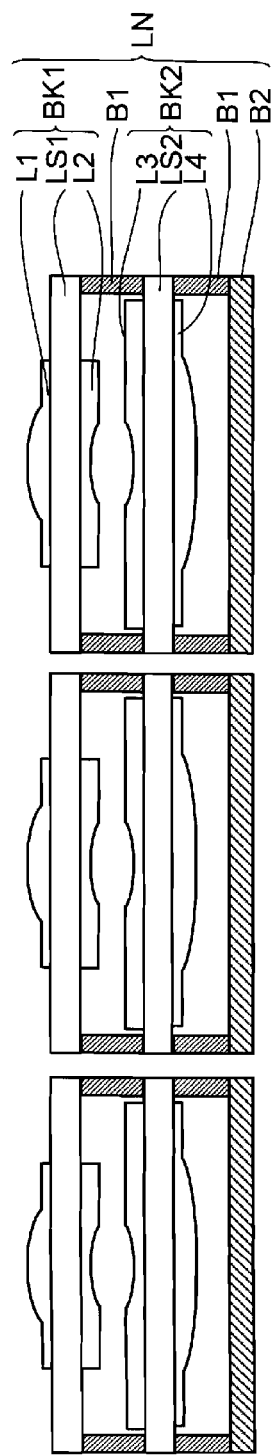
FIG. 12C is a sectional diagram of the imaging lens.

The first lens substrate LS1, the second lens substrate LS2, the spacer members B1, and the substrate 2 thus integrated into a unit are then cut along the lattice frame of the spacer members B1 (at the positions indicated by the broken lines Q); this produces a plurality of imaging lenses LN of a two-element construction as shown in FIG. 12C.

Manufacturing the imaging lens LN by cutting apart a member having a plurality of lens blocks BK (a first lens block BK1 and a second lens block BK2) built into it as described above eliminates the need for lens interval adjustment and assembly with each individual imaging lens LN. This makes it possible to mass-produce the imaging lens LN.

In addition, the spacer members B1 have the shape of a lattice. They thus serve as a guide that helps cut apart the imaging lens LN from the member having a plurality of lens blocks BK built into it. The imaging lens LN can thus be cut apart easily, without much time and trouble, from the member having a plurality of lens blocks BK built into it. This makes it possible to mass-produce the imaging lens inexpensively.

In light of the foregoing, the manufacturing method of the imaging lens LN includes a joining step in which a spacer member B1 is arranged at least at part of the peripheral edge of lens blocks BK and a plurality of lens block units UT are joined together with the spacer members B1 in between, and a cutting step in which the lens block units UT now joined together are cut apart along the spacer members B1. A manufacturing method like this is suitable for mass-production of inexpensive lens system.

[Lens Construction of the Imaging Lens]

Next, the lens construction of the imaging lens LN in different practical examples, namely Examples (EX) 1 to 5, will be described with reference to optical sectional diagrams in FIGS. 1 to 5.

The symbols used to identify the relevant members in optical sectional diagrams, etc. are as follows:

Li represents a lens L;
LSi represents a lens substrate LS (in all practical examples, the lens substrate LS is a plane-parallel plate);
BKi represents a lens block;
PTi represents a plane-parallel plate (use of this symbol is limited to a plane-parallel plate with which no lens L is contiguous);
si represents a lens surface or substrate surface;
i is a number suffixed as in "Li" to represent the place in order, among the members of the same kind, as counted from the object side to the image side;
* indicates an aspherical surface (a surface not adjoining a lens substrate LS but making contact with air is an aspherical surface);
ape represents an aperture stop; and
AX represents the optical axis.

A lens L suffixed with a number representing its place in order as counted from the object side to the image side may also be identified by an alternative expression. Specifically, with respect to a lens substrate LS (any of a first to a fourth lens substrate LS1 to LS4), a lens on the object side (o) thereof and a lens on the image side (i) thereof may alternatively be identified as a lens L[LS1$o$] and a lens L[LS1$m$], a lens L[LS2$o$] and a lens L[LS2$m$], a lens L[LS3$o$] and a lens L[LS3$m$], and a lens L[LS4$o$] and a lens L[LS4$m$], respectively.

EXAMPLE 1

In Example 1, the imaging lens LN includes three lens blocks BK1 to BK3 disposed in this order from the object side to the image side, and also includes an aperture stop ape.

The first lens block BK1 disposed at the most object-side position includes a first lens substrate LS1. A first lens L1 (lens L[LS1$o$]) is contiguous with the object-side substrate surface of the first lens substrate LS1, and a second lens L2 (lens L[LS1$m$]) is contiguous with the image-side substrate surface of the first lens substrate LS1. Specifically, the first and second lenses L1 and L2 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and
The 2nd lens L2 is a plano-concave lens concave to the image side (its image-side lens surface being an aspherical surface).

The second lens block BK2 is located to the image side of the first lens block BK1, and includes a second lens substrate LS2. Only with the object-side substrate surface of the second lens substrate LS2, a lens (a third lens L3 (lens L[LS2$o$])) is contiguous. Specifically, the third lens L3 is configured as noted below.

The 3rd lens L3 is a plano-concave lens concave to the object side (its object-side lens surface being an aspherical surface).

The third lens block BK2 is located to the image side of the second lens block BK2, and includes a third lens substrate LS3. A fourth lens L4 (lens L[LS3$o$]) is contiguous with the object-side substrate surface of the third lens substrate LS3, and a fifth lens L5 (lens L[LS3$m$]) is contiguous with the image-side substrate surface of the third lens substrate LS3. Specifically, the fourth and fifth lenses L4 and L5 are configured as noted below.

The 4th lens L4 is a plano-convex lens convex to the object side (its object-side lens surface being a spherical surface that is convex in its part where it intersects the optical axis and that is concave in its part where it intersects the principal ray with the maximum image height);

The 5th lens L5 is a plano-concave lens concave to the image side (its image-side lens surface being an aspherical surface).

EXAMPLE 2

In Example 2, the imaging lens LN includes a first lens block BK1, a second lens block BK2, a third lens block BK3, and an aperture stop ape. What is particular about this imaging lens LN, as distinct from the imaging lens LN of Example 1, is that it includes a lens substrate LS in which lens substrate pieces LSP and LSP are contiguous with each other.

The first lens block BK1 includes a first lens substrate LS1. The first lens substrate LS1 is formed by joining together (such as by cementing together) a lens substrate piece LSP1$o$ located on the object side and a lens substrate piece LSP1$m$ located on the image side. Even with such a first lens substrate LS1, both its, object-side and image-side, substrate surfaces (the object-side substrate surface of the lens substrate piece LSP1$o$ and the image-side substrate surface of the lens substrate piece LSP1$m$) are planar. Thus, the first lens substrate LS1 is a plane-parallel plate.

A first lens L1 (lens L[LS1$o$]) is contiguous with the object-side substrate surface of the first lens substrate LS1, and a second lens L2 (lens L[LS1$m$]) is contiguous with the image-side substrate surface of the first lens substrate LS1. Specifically, the first and second lenses L1 and L2 are configured as noted below. The aperture stop ape is formed at the boundary surface between the lens substrate pieces LSP1$o$ and LSP1$m$ in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2$o$]) contiguous with the object-side substrate surface of the second lens substrate and a fourth lens L4 (lens L[LS2$m$]) contiguous with the image-side substrate surface of the second lens substrate LS2 are configured as noted below.

The 3rd lens L3 is a plano-concave lens concave to the object side (its object-side lens surface being an aspherical surface); and The 4th lens L4 is a plano-convex lens convex to the image side (its image-side lens surface being an aspherical surface).

In the third lens block BK3, only with the object-side substrate surface of the third lens substrate LS3, a lens (a fifth lens L5 (lens L[LS3$o$])) is contiguous. Specifically, the fifth lens L5 is configured as noted below.

The 5th lens L5 is a plano concave lens concave to the object side (its object-side lens surface being an aspherical surface).

EXAMPLE 3

In Example 3, the imaging lens LN includes a first, a second, and a third lens block BK1, BK2 and BK3, and also a fourth lens block BK4. The fourth lens block BK4 is located to the image side of the third lens block BK3. Moreover, the imaging lens LN also includes an aperture stop ape.

In the first lens block BK1, a first lens L1 (lens L[LS1$o$]) contiguous with the object-side substrate surface of the first lens substrate and a second lens L2 (lens L[LS1$m$]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object-side (its object-side lens surface being an aspherical surface); and The 2nd lens L2 is a plano-concave lens concave to the image side (its image-side lens surface being an aspherical surface).

In the second lens block BK2, a third lens L3 (lens L[LS2$o$]) contiguous with the object-side substrate surface of the second lens substrate and a fourth lens L4 (lens L[LS2$m$]) contiguous with the image-side substrate surface of the second lens substrate are configured as noted below.

The 3rd lens L3 is a plano-concave lens concave to the object side (its object-side lens surface being an aspherical surface); and The 4th lens L4 is a plano-convex lens convex to the image side (its image-side lens surface being an aspherical surface that is convex at its vertex and that is concave in its part where it intersects the principal ray with the maximum image height).

The third lens block BK3 includes a third lens substrate LS3, and only with the image-side substrate surface of the third lens substrate LS3, a lens (a fifth lens L5 (lens L[LS3$m$])) is contiguous. Specifically, the fifth lens L5 is configured as noted below.

The 5th lens L5 is a plano-convex lens convex to the image side.

The fourth lens block BK4 includes a fourth lens substrate LS4, and a sixth lens L6 (lens L[LS4$o$]) is contiguous with the object-side substrate surface of the fourth lens substrate LS4, and a seventh lens L7 (lens L[LS4$m$]) is contiguous with the image-side substrate surface of the fourth lens substrate LS4. Specifically, the sixth and seventh lenses L6 and L7 are configured as noted below.

The 6th lens L6 is a plano-concave lens concave to the object side (its object-side lens surface being an aspherical surface that is concave at its vertex and that is convex in its part where it intersects the principal ray with the maximum image height).

The 7th lens L7 is a plano-concave lens concave to the image side (its image-side lens surface being an aspherical surface) (its image-side lens surface being an aspherical surface that is concave at its vertex and that is convex in its part where it intersects the principal ray with the maximum image height).

EXAMPLE 4

In Example 4, the imaging lens LN includes a first and a second lens block BK1 and BK2, and includes a plane-parallel plate PT1 located to the image side of the second lens block BK2 (needless to say, it also includes an aperture stop ape). That is, here, the imaging lens LN includes two lens blocks, namely the first and second lens blocks BK1 and BK2 as lens blocks BK (optical devices having an optical power). The aperture stop ape is located to the object side of the first lens block BK1 (here, the aperture stop ape too is identified by a surface symbol, namely "s1").

In the first lens block BK1, a first lens L1 (lens L[LS1$o$]) contiguous with the object-side substrate surface of the first lens block BK1 and a second lens L2 (lens L[LS1$m$]) contiguous with the image-side substrate surface of the first lens substrate LS1 are configured as noted below.

The 1st lens L1 is a plano-convex lens convex to the object side (its object-side lens surface being an aspherical surface); and The 2nd lens L2 is a plano-concave lens concave to the image side (its image-side lens surface being an aspherical surface).

The second lens block BK2 includes a second lens substrate LS2, and only with the object-side substrate surface of the second lens substrate LS2, a lens (a third lens L3 (lens L[LS2o])) is contiguous. Specifically, the third lens L3 is configured as noted below.

The 3rd lens L3 is a plano-concave lens concave to the object side (its object-side lens surface being an aspherical surface); and

EXAMPLE 5

In Example 5, the imaging lens LN includes a first lens substrate LS1, and a plane-parallel plate PT1 located to the image side of the first lens block BK1 (needless to say, it also includes an aperture stop ape).

The first lens block BK1 includes a first lens substrate LS1, and only with the image-side substrate surface of the first lens substrate LS1, a lens (a first lens L1 (lens L[LS1m])) is contiguous. Specifically, the first lens L1 is configured as noted below. The aperture stop ape is formed on the object-side substrate surface of the first lens substrate LS1.

The 1st lens L1 is a plano-convex lens convex to the image side (its image-side lens surface being an aspherical surface).

[Lens Data of the Imaging Lens]

Next, with respect to the imaging lenses LN of Examples (EX) 1 to 5, their respective general data, construction data, and aspherical surface data will be presented in tables.

The symbols used to present general data are as follows:

f represents the focal length (in the unit of mm);

Fno represents the f-number;

BF represents the back-focal length (given as an equivalent length in air, which applies also to the back-focal length included in the optical total length of the imaging lens LN);

Y' represents the image height (in the unit of mm; with distortion disregarded);

ω represents the half angle of view (in the unit of degrees; with distortion taken into consideration); and TL represents the total length of the imaging lens LN (in the unit of mm).

With respect to a lens L contiguous with the object-side substrate surface of a lens substrate LS, its focal length is calculated on the assumption that air is present on the object side of that lens L and that the medium of the lens substrate LS is present on the image side of the lens L. With respect to a lens L contiguous with the image-side substrate surface of the lens substrate LS, its focal length is calculated on the assumption that the medium of the lens substrate LS is present on the object side of that lens L and that air is present on the image side of the lens L.

With respect to the object-side lens surface of an uncemented lens L, its focal length is calculated on the assumption that air is present on the object side of the lens L and that the medium of the lens substrate LS is present on the image side of the lens L. Needless to say, with respect to the image-side lens surface of the uncemented lens L, its focal length is calculated on the assumption that the medium of the lens substrate LS is present on the object side of the lens L and that air is present on the image side of the image side of the lens L.

The symbols used to present the construction data are as follows:

si represents a lens surface or substrate surface, with the suffixed number representing its place in order as counted from the object side to the image side;

i is a number suffixed as in "si" to represent the place in order as counted from the object side to the image side;

* indicates an aspherical surface;

ape represents an aperture stop;

r represents a radius of curvature (in the unit of mm) of a lens surface or a substrate surface;

d represents an axial surface-to-surface distance (in the unit of mm);

Nd represents the index of refraction of a medium for d-line (with a wavelength of 587.56 nm); and vd represents the Abbe number of a medium for d-line.

Aspherical data is defined by the formula (AS) below employing the local rectangular coordinate system (x, y, z) having its origin at the vertex of an aspherical surface. Presented for each relevant surface (si) are the values of K and A to I below (wherever A to I are zero, they are omitted); for all these values, "E–n" stands for "×10$^{-n}$".

$$z = (c \cdot \rho^2)/\left[1 + \sqrt{1-(1+K) \cdot c \cdot \rho^2}\right] + A \cdot \rho^4 + B \cdot \rho^6 + C \cdot \rho^8 + D \cdot \rho^{10} + E \cdot \rho^{12} + F \cdot \rho^{14} + G \cdot \rho^{16} + H \cdot \rho^{18} + I \cdot \rho^{20} \qquad (AS)$$

where

ρ represents the height in a direction perpendicular to the z-axis (the optical axis AX) ($\rho^2 = x^2 + y^2$);

z represent the amount of sag in the optical axis AX direction at the height ρ (relative to the vertex);

c represents the curvature (the reciprocal of the radius of curvature r) at the vertex;

K represents the conical constant; and

A to I represents the aspherical surface coefficients of orders 4, 6, 10, 12, 14, 16, 18, and 20, respectively.

EXAMPLE 1

TABLE 1

| EXAMPLE 1 | | | | | | | |
|---|---|---|---|---|---|---|---|
| f [mm] 2.927 | | | Fno 2.8 | | | BF [mm] 0.6582 | |
| Y' [mm] 1.750 | | | ω [°] 30.88 | | | TL [mm] 3.176 | |
| si | i | r [mm] | i | d [mm] | i | Nd | vd | Element |
| s1 | * 1 | 0.798 | | | | | | |
| | | | 1 | 0.339 | 1 | 1.5071 | 54.00 | L1 BK1 |
| s2 | ape 2 | ∞ | | | | | | |
| | | | 2 | 0.308 | 2 | 1.5508 | 43.35 | LS1 |
| s3 | 3 | ∞ | | | | | | |
| | | | 3 | 0.109 | 3 | 1.5737 | 29.00 | L2 |
| s4 | * 4 | 2.618 | | | | | | |
| | | | 4 | 0.207 | | | | |
| s5 | * 5 | −1.816 | | | | | | |
| | | | 5 | 0.099 | 4 | 1.5737 | 29.00 | L3 BK2 |
| s6 | 6 | ∞ | | | | | | |
| | | | 6 | 0.375 | 5 | 1.5508 | 43.35 | LS2 |
| s7 | 7 | ∞ | | | | | | |
| | | | 7 | 0.100 | | | | |
| s8 | * 8 | 3.325 | | | | | | |
| | | | 8 | 0.104 | 6 | 1.5071 | 54.00 | L4 BK3 |

TABLE 1-continued

EXAMPLE 1

| f [mm] 2.927 | | | Fno 2.8 | | | BF [mm] 0.6582 | |
|---|---|---|---|---|---|---|---|
| Y' [mm] 1.750 | | | ω [°] 30.88 | | | TL [mm] 3.176 | |
| si | i | r [mm] | i | d [mm] | i | Nd | vd | Element |
| s9 | 9 | ∞ | | | | | | |
| | | | 9 | 0.304 | 7 | 1.5531 | 43.28 | LS3 |
| s10 | 10 | ∞ | | | | | | |
| | | | 10 | 0.572 | 8 | 1.5071 | 54.00 | L5 |
| s11 | * | | | | | | | |
| | 11 | 3.856 | 11 | 0.658 | | | | |
| s12 | 12 | ∞ | | | | | | SR |

TABLE 2

EXAMPLE 1
Aspherical Surface Data

| si | s1 | s4 | s5 | s8 | s11 |
|---|---|---|---|---|---|
| K | 1.95E−02 | 2.43E+01 | 1.09E+01 | −1.36E+02 | −1.06E+02 |
| A | −7.50E−04 | 1.22E−01 | 2.12E−01 | −1.18E−01 | −1.22E−01 |
| B | 1.22E−01 | −4.91E−01 | −1.32E+00 | −4.71E−02 | 1.34E−02 |
| C | −1.64E−01 | 1.15E+00 | 1.69E+00 | 1.00E−03 | −1.88E−02 |
| D | 8.90E−01 | 2.30E−02 | −3.12E+00 | −3.52E−02 | −1.51E−02 |
| E | −2.19E+00 | −8.87E+00 | 2.70E+00 | −6.31E−03 | 7.97E−03 |
| F | 4.90E+00 | −3.57E+00 | 2.82E+01 | −2.61E−04 | 4.14E−03 |
| G | 0.00E+00 | −1.85E+02 | 4.19E+01 | 1.40E+00 | −3.86E−03 |
| H | 0.00E+00 | 8.43E+02 | −1.28E+03 | 3.75E−02 | 2.95E−04 |
| I | 0.00E+00 | 0.00E+00 | 5.02E+00 | 2.89E−02 | 7.25E−05 |

TABLE 3

EXAMPLE 2

| f [mm] 2.720 | | | Fno 2.8 | | | BF [mm] 0.3582 | | |
|---|---|---|---|---|---|---|---|---|
| Y' [mm] 1.750 | | | ω [°] 32.80 | | | TL [mm] 3.010 | | |
| si | | i | r [mm] | i | d [mm] | i | Nd | vd | Element |
| s1 | * | 1 | 0.791 | | | | | | |
| | | | | 1 | 0.250 | 1 | 1.5150 | 58.10 | L1 | BK1 |
| s2 | | 2 | ∞ | | | | | | |
| | | | | 2 | 0.070 | 2 | 1.7730 | 49.60 | LSP1o | LS1 |
| s3 | ape | 3 | ∞ | | | | | | |
| | | | | 3 | 0.300 | 3 | 1.4870 | 70.20 | LSP1m |
| s4 | | 4 | ∞ | | | | | | |
| | | | | 4 | 0.050 | 4 | 1.4740 | 47.00 | L2 |
| s5 | * | 5 | 1.626 | | | | | | |
| | | | | 5 | 0.396 | | | | |
| s6 | * | 6 | −3.568 | | | | | | |
| | | | | 6 | 0.100 | 5 | 1.6360 | 23.00 | L3 | BK2 |
| s7 | | 7 | ∞ | | | | | | |
| | | | | 7 | 0.450 | 6 | 1.6060 | 37.00 | LS2 |
| s8 | | 8 | ∞ | | | | | | |
| | | | | 8 | 0.250 | 7 | 1.6360 | 23.00 | L4 |
| s9 | * | 9 | −3.250 | | | | | | |
| | | | | 9 | 0.278 | | | | |
| s10 | * | 10 | −3.229 | | | | | | |
| | | | | 10 | 0.205 | 8 | 1.6360 | 23.00 | L5 | BK3 |
| s11 | | 11 | ∞ | | | | | | |
| | | | | 11 | 0.300 | 9 | 1.4870 | 70.20 | LS3 |
| s12 | | 12 | ∞ | | | | | | |
| | | | | 12 | 0.358 | | | | |
| s13 | | 13 | ∞ | | | | | | SR |

TABLE 4

EXAMPLE 2
Aspherical Surface Data

| si | s1 | s5 | s6 | s9 | s10 |
|----|----|----|----|----|-----|
| K | 2.59E−01 | 8.19E+00 | 3.23E+01 | −1.40E+02 | −2.25E+02 |
| A | −8.47E−02 | 9.20E−02 | −1.58E−01 | 1.06E−01 | 1.65E−01 |

TABLE 4-continued

EXAMPLE 2
Aspherical Surface Data

| si | s1 | s5 | s6 | s9 | s10 |
|----|----|----|----|----|-----|
| B | 9.86E−02 | −4.07E−01 | −5.09E−01 | −2.17E−01 | −8.46E−02 |
| C | −6.70E−01 | 2.58E+00 | −1.01E+00 | 4.84E−02 | 1.38E−02 |

EXAMPLE 3

TABLE 5

EXAMPLE 3 f [mm] 2.750    Fno 2.8         BF [mm] 0.1081
Y' [mm] 1.750   ω [°] 32.32     TL [mm] 3.198

| si | | i | r [mm] | i | d [mm] | i | Nd | vd | Element | |
|----|----|----|--------|----|--------|----|----|----|---------|---|
| s1 | * | 1 | 0.923 | | | | | | | |
| | | | | 1 | 0.330 | 1 | 1.5071 | 54.00 | L1 | BK1 |
| s2 | ape | 2 | ∞ | | | | | | | |
| | | | | 2 | 0.300 | 2 | 1.5300 | 48.91 | LS1 | |
| s3 | | 3 | ∞ | | | | | | | |
| | | | | 3 | 0.080 | 3 | 1.5740 | 29.00 | L2 | |
| s4 | * | 4 | 5.000 | | | | | | | |
| | | | | 4 | 0.336 | | | | | |
| s5 | * | 5 | −3.144 | | | | | | | |
| | | | | 5 | 0.075 | 4 | 1.5740 | 29.00 | L3 | BK2 |
| s6 | | 6 | ∞ | | | | | | | |
| | | | | 6 | 0.359 | 5 | 1.5300 | 48.91 | LS2 | |
| s7 | | 7 | ∞ | | | | | | | |
| | | | | 7 | 0.100 | 6 | 1.5740 | 29.00 | L4 | |
| s8 | * | 8 | −4.805 | | | | | | | |
| | | | | 8 | 0.050 | | | | | |
| s9 | | 9 | ∞ | | | | | | | |
| | | | | 9 | 0.678 | 7 | 1.5300 | 48.91 | LS3 | BK3 |
| s10 | | 10 | ∞ | | | | | | | |
| | | | | 10 | 0.132 | 8 | 1.5740 | 29.00 | L5 | |
| s11 | * | 11 | −277.220 | | | | | | | |
| | | | | 11 | 0.200 | | | | | |
| s12 | * | 12 | −1.681 | | | | | | | |
| | | | | 12 | 0.050 | 9 | 1.5740 | 29.00 | L6 | BK4 |
| s13 | | 13 | ∞ | | | | | | | |
| | | | | 13 | 0.300 | 10 | 1.5300 | 48.91 | LS4 | |
| s14 | | 14 | ∞ | | | | | | | |
| | | | | 14 | 0.100 | 11 | 1.5740 | 29.00 | L7 | |
| s15 | * | 15 | 15.376 | | | | | | | |
| | | | | 15 | 0.108 | | | | | |
| s16 | | 16 | ∞ | | | | | | | SR |

TABLE 6

EXAMPLE 3
Aspherical Surface Data

| si | s1 | s4 | s5 | s8 | s11 | s12 | s15 |
|----|----|----|----|----|-----|-----|-----|
| K | 2.77E−01 | 2.04E+01 | −9.39E+01 | 2.08E+01 | −1.00E+03 | −1.03E+01 | −1.00E+03 |
| A | −3.94E−02 | 2.87E−02 | −5.69E−01 | 1.62E−01 | 1.29E−01 | 8.52E−02 | 2.22E−01 |
| B | −2.96E−01 | −4.79E−01 | 9.32E−01 | 5.78E−02 | −1.38E−01 | −1.79E−02 | −3.20E−01 |
| C | 1.48E+00 | 3.30E+00 | −5.77E+00 | −6.96E−02 | 4.81E−02 | 7.43E−04 | 1.52E−01 |
| D | −3.81E+00 | −1.41E+01 | 5.95E+00 | −3.63E−02 | 7.38E−03 | −3.75E−05 | −1.80E−02 |
| E | −4.17E+00 | 3.20E+00 | 1.13E+01 | 2.85E−02 | −8.22E−03 | 3.18E−04 | −5.09E−03 |
| F | 2.60E+01 | 5.49E+01 | −5.99E+01 | 1.61E−02 | −1.40E−03 | −5.95E−05 | 4.89E−04 |
| G | −2.50E+01 | 1.37E+01 | −2.95E+01 | −7.64E−03 | 1.20E−03 | 0.00E+00 | 2.65E−04 |
| H | 9.60E+00 | −3.02E+01 | −7.94E+01 | −1.87E−03 | 2.21E−04 | 0.00E+00 | 3.59E−05 |
| I | 2.94E+00 | −3.27E+02 | −2.39E+02 | 5.60E−02 | −1.17E−04 | 0.00E+00 | −1.86E−05 |

EXAMPLE 4

TABLE 7

EXAMPLE 4

| f [mm] 1.511 | | | Fno 2.8 | | | BF [mm] 0.5203 | |
|---|---|---|---|---|---|---|---|
| Y' [mm] 0.880 | | | ω [°] 30.21 | | | TL [mm] 2.197 | |

| si | i | r [mm] | i | d [mm] | i | Nd | vd | Element |
|---|---|---|---|---|---|---|---|---|
| s1 | ape | 1 | ∞ | 1 | 0.116 | | | ape |
| s2 | * | 2 | 0.609 | 2 | 0.120 | 1 | 1.4300 56.60 | L1 BK1 |
| s3 | | 3 | ∞ | 3 | 0.500 | 2 | 1.5168 64.20 | LS1 |
| s4 | | 4 | ∞ | 4 | 0.050 | 3 | 1.6363 23.00 | L2 |
| s5 | * | 5 | 24.585 | 5 | 0.100 | | | |
| s6 | * | 6 | −10.000 | 6 | 0.120 | 4 | 1.4300 56.60 | L3 BK2 |
| s7 | | 7 | ∞ | 7 | 0.500 | 5 | 1.5168 64.20 | LS2 |
| s8 | | 8 | ∞ | 8 | 0.100 | | | |
| s9 | | 9 | ∞ | 9 | 0.500 | 6 | 1.5168 64.20 | PT1 |
| s10 | | 10 | ∞ | 10 | 0.090 | | | |
| s11 | | 11 | ∞ | | | | | SR |

TABLE 8

EXAMPLE 4
Aspherical Surface Data

| si | s2 | s5 | s6 |
|---|---|---|---|
| K | −2.98E+00 | −9.70E+04 | 2.60E+02 |
| A | −7.16E−01 | 3.16E+00 | 1.48E+00 |
| B | 8.71E+01 | −8.93E+01 | −5.03E+01 |
| C | −1.17E+03 | 1.35E+03 | 3.90E+02 |
| D | 1.48E+03 | −8.65E+03 | −1.14E+03 |
| E | 1.39E+04 | −8.97E+03 | 0.00E+00 |
| F | −4.55E+04 | 3.15E+05 | 0.00E+00 |
| G | 8.01E+06 | 4.50E+05 | 0.00E+00 |
| H | 1.43E+08 | −1.55E+07 | 0.00E+00 |
| I | −2.37E+09 | 4.47E+07 | 0.00E+00 |

EXAMPLE 5

TABLE 9

EXAMPLE 5

| f [mm] 1.317 | | | Fno 2.8 | | | BF [mm] 1.3175 | |
|---|---|---|---|---|---|---|---|
| Y' [mm] 0.880 | | | ω [°] 33.75 | | | TL [mm] 2.103 | |

| si | i | r [mm] | i | d [mm] | i | Nd | vd | Element |
|---|---|---|---|---|---|---|---|---|
| s1 | ape | 1 | ∞ | | | | | |
| | | | | 1 | 0.434 | 1 | 1.5168 64.00 | LS1 BK1 |
| s2 | | 2 | ∞ | | | | | |
| | | | | 2 | 0.216 | 2 | 1.5200 54.00 | L1 |
| s3 | * | 3 | −0.672 | | | | | |
| | | | | 3 | 0.150 | | | |
| s4 | | 4 | ∞ | | | | | |
| | | | | 4 | 0.400 | 3 | 1.5163 64.00 | PT1 |
| s5 | | 5 | ∞ | | | | | |
| | | | | 5 | 0.903 | | | |
| s6 | | 6 | ∞ | | | | | SR |

TABLE 10

EXAMPLE 5
Aspherical Surface Data

| si | s3 |
|---|---|
| K | 3.35E−01 |
| A | 1.28E+00 |

TABLE 10-continued

EXAMPLE 5
Aspherical Surface Data

| si | s3 |
|---|---|
| B | −1.10E+01 |
| C | 5.77E+01 |
| D | −9.18E+01 |
| E | 2.76E+01 |

[Aberrations in the Imaging Lens]

The aberrations in the imaging lens LN in Examples (EX) 1 to 5 are shown in FIGS. 6A to 10C. These aberration diagrams show longitudinal spherical aberration, astigmatism (astigmatic field curves), and distortion.

The spherical aberration diagrams show the amount of spherical aberration for d-line (with a wavelength of 587.56 nm), the amount of spherical aberration for C-line (with a wavelength of 656.28 nm), and the amount of spherical aberration for g-line (with a wavelength of 435.84 nm), as expressed in terms of deviations from the paraxial image surface along the optical axis AX (in the unit of nm). In the spherical aberration diagrams, the vertical axis represents the value of the height of incidence on the pupil as normalized with respect to its maximum height (i.e., the relative pupil height). What types of line are used to represent d-, c-, and g-lines is indicated in each diagram.

The astigmatism diagrams show the tangential image surface for d-line and the sagittal image surface for d-line, as expressed in terms of deviations from the paraxial image surface along the optical axis AX (in the unit of mm). The line marked "T" corresponds to the tangential image surface, and the line marked "S" corresponds to the sagittal image surface. In the astigmatism diagrams, the vertical axis represents the image height (IMG HT) (in the unit of mm).

In the distortion diagrams, the horizontal axis represents the distortion (in the unit of %) for d-line, and the vertical axis represents the image height (in the unit of mm). The image height corresponds to the maximum image height Y' (half the diagonal length of the sensing surface SS of the imaging sensor SR) on the imaging surface.

[Details of the Imaging Lens]

The construction of the imaging lens LN will now be described in more detail below.

The imaging lens LN includes a lens block (wafer scale lens) BK. The lens block BK is, as described previously, mass-produced inexpensively. To allow a wider choice of materials in its production, for example, to allow the choice of easy-to-process or inexpensive materials (to manufacture the imaging lens LN easily and inexpensively), the lens block BK includes a lens L and a lens substrate LS made of different materials.

Furthermore, in consideration of a balance among various benefits such as compactness, high performance (for example, high aberration correction performance), and low cost, the imaging lens LN includes one, two, three, or four lens blocks BK (the imaging lens LN includes at least one lens block BK1). What makes an imaging lens LN including four or less lens blocks especially preferable is that with them the benefits of a reduced number of lenses are more notable.

As shown in FIGS. 12B and 12C, the imaging lens LN is manufactured by joining together lens block units UT, which each have a number of molded lenses L arranged on a lens substrate LS, and also a substrate B2, which can serve as a sensor cover, with spacer members B1 in between, and then cutting them apart along the spacer members B1.

Thus, when the lens substrates LS are plane-parallel plates, in the manufacturing process of the imaging lens LN, not only is the processing of the lens substrate LS easy or unnecessary, but also the lenses L, formed on the substrate surfaces, are stable. Thus, a lens substrate LS in the form of a plane-parallel plate helps alleviate the burden involved in the manufacturing of the imaging lens LN.

Furthermore, when the lens substrates LS are plane-parallel plates, the boundary surface between a substrate surface and a lens L has no optical power. Thus, for example, the surface accuracy on a substrate surface of the lens substrate LS little affects the focus position of the imaging lens LN on the image surface. This gives the imaging lens LN high performance.

In the imaging lens LN, a first lens block BK exerts a positive optical power. With this design, the light (light beam) incident from the object side of the first lens block BK1 is first made to converge, and is then, by various surfaces located to the image side of the first lens block BK1, made to diverge from the optical axis and thereby separated into parts at different image heights (hereinafter, this phenomenon will be referred to as "a light beam being separated"). Separating a light beam by surfaces (substrate surfaces and lens surfaces) in this way permits, for example, lens surfaces to correct aberrations for each of the separated parts of the light beam. Thus, in the imaging lens LN, aberrations are corrected efficiently.

In addition, in an imaging lens LN including such a first lens block BK1 exerting a positive optical power, it is preferable that at least one lens block BK include a lens L contiguous only with either the object-side or image-side substrate surface of a lens substrate LS.

Suppose that, in a lens block BK including a plurality of optical devices (for example, one lens substrate LS and two lenses L sandwiching it from both sides), for example, the two lenses L are eccentric from predetermined positions relative to the lens substrate LS. In this case, depending on the directions of the eccentricity of the two lenses L (for example, if the lenses are eccentric in mutually opposite directions), the sensitivity to manufacturing errors attributable to the eccentricity of the lenses L is cancelled out, and thus the performance of the lens block BK as a whole is not extremely degraded.

Depending on the directions of the eccentricity of the two lenses (for example, if the lenses are eccentric in the same direction), the sensitivity to manufacturing errors attributable to the eccentricity of the lenses is augmented, and thus the performance of the lens block as a whole may be extremely degraded. To prevent such degradation of the performance of the lens block BK (for example, degraded aberration correction performance), preferably, the lens block simply includes one lens substrate and one lens L (needless to say, an imaging lens LN including such a lens block BK is inexpensive owing to a reduced number of lenses).

In a case where the imaging lens LN is made compact with lens blocks BK arranged close to each other, when those closely arranged lens blocks include a lens L only on one side thereof, comparatively much freedom is allowed in the shape of a lens L adjacent thereto. Thus, in such an imaging lens LN, aberrations are corrected efficiently by use of a lens L formed with much freedom.

For example, in an imaging lens LN including only one lens block BK, locating a lens L only on the image side of that lens block is advantageous in terms of performance. This is because the aperture stop ape is then located to the object side of the lens L and a light beam is, by the lens surface of the lens L, separated into parts at different image heights; thus, aberrations are corrected efficiently for each of the separated parts of the light beam at different image heights. In particular, curvature of field is corrected efficiently.

In the lens block BK, since the lens substrate LS is a plane-parallel plate, its planar substrate surfaces having no curvature have no significant effect on aberration correction performance. Thus even when a lens L is contiguous only with one substrate surface of the lens substrate LS, aberrations are reduced in the lens block BK as a whole (here, in the lens block BK, it is preferable that a lens L having a lens surface so close to planar as not to significantly affect aberration correction be removed).

With a lens block BK in which only with the object-side substrate surface of a lens substrate LS a lens L is contiguous, that lens substrate LS of the lens block BK can also serve as a cover glass of the imaging sensor SR. For example, in an imaging lens LN including two lens blocks BK, when the second lens block BK2 includes a lens L[LS2o] contiguous only with the object-side substrate surface of a second lens substrate LS2, the second lens substrate LS2 can serve as a cover glass.

In the imaging lens LN, it is preferable that conditional formula (D1) below be fulfilled. Conditional formula (D1) defines the focal length of the first lens block BK1 in terms of the focal length of the entire imaging lens LN (entire system).

$$0.6 \leq f[BK1]/f[all] \leq 2.0 \tag{D1}$$

where f[BK1] represents the focal length of the first lens block; and f[all] represents the focal length of the entire imaging lens.

If the value of conditional formula (D1) is less than the lower limit, for example, the positive optical power of the first lens block BK1 is too strong, and thus the angle of emergence of light is excessively large. This leads to lower telecentricity to the image surface. Owing to the too strong positive optical power of the first lens block BK1, the imaging lens LN tends to produce aberrations.

By contrast, if the value of conditional formula (D1) is more than the upper limit, for example, the positive optical power of the first lens block BK1 is too weak, and thus the light reaching the second lens block BK2, etc. is not separated into parts at different image heights. This makes it difficult to correct aberrations for each of the separated parts of the light beam at different image heights. Moreover, owing to the focal length of the first lens block BK1 being comparatively long, the imaging lens LN has an increased optical total length.

Thus, when the value of conditional formula (D1) falls within the range from the lower limit to the upper limit, the imaging lens LN is compact and has high performance (for example, telecentricity, and high aberration correction performance).

In the first lens block BK1 exerting a positive optical power in the imaging lens LN, it is preferable that a lens L[LS1o] be contiguous with the object-side substrate surface of the first lens substrate LS1, and that the object-side lens surface of the lens L[LS1o] be convex to the object side.

With this design, the light (light beam) incident from the object side of the lens L[LS1o] is first made to converge, and is then, by various surfaces located to the image side of the lens L[LS1o], made to diverge from the optical axis and thereby separated into parts at different image heights. Separating a light beam by surfaces (substrate surfaces and lens surfaces) in this way permits, for example, lens surface to correct aberrations for each of the separated parts of the light beam. Thus, in the imaging lens LN, aberrations are corrected efficiently.

In addition, in such an imaging lens LN including a lens L[LS1o] whose object-side surface is convex, it is preferable that conditional formula (D2) below be fulfilled. Conditional formula (D2) defines the ratio of the index of refraction of the first lens substrate LS1 to the index of refraction of the lens L[LS1o], and in short signifies that the index of refraction of the first lens substrate LS1 is higher than that of the lens L[LS1o].

$$1<N[LS1]/N[L[LS1o]] \tag{D2}$$

where
 N[LS1] represents the index of refraction of the first lens substrate LS1; and
 N[L[LS1o]] represents the index of refraction of the lens L[LS1o].

Figure 13:
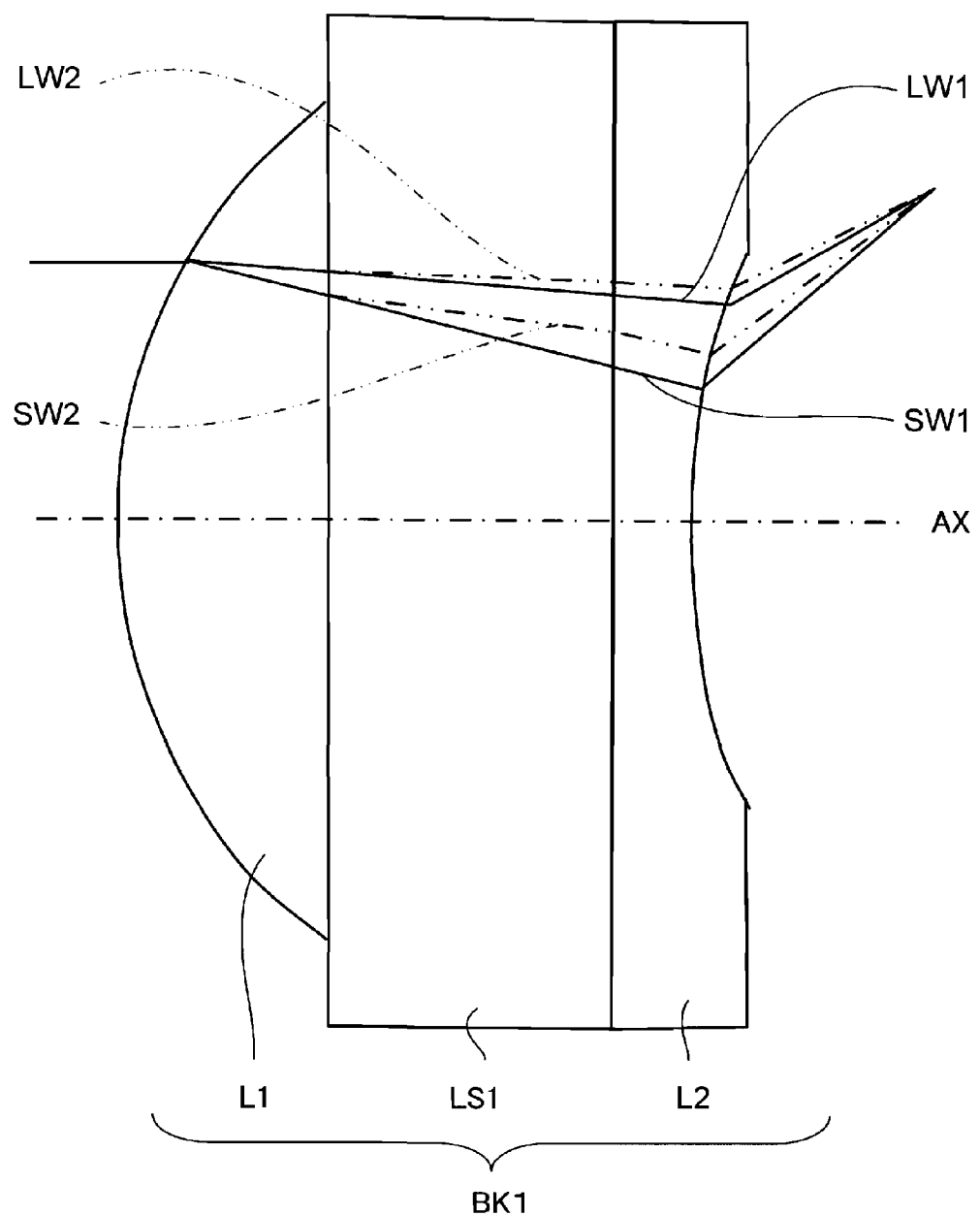
FIG. 13 is a sectional diagram of a lens block used for an explanation.

Conditional formula (D2) will now be described with reference to FIG. 13. FIG. 13 shows the first lens block BK1. In FIG. 13, the solid lines SW1 and LW1 represent, for a case where the lens substrate LS1 is absent, the optical paths of short wavelength light and long wavelength light, respectively (in short, their optical paths on the assumption that they travel in air), and the dash-dot-dot lines SW2 and LW2 represent, for a case where the lens substrate LS is present, the optical paths of short wavelength light and long wavelength light, respectively.

As shown in FIG. 13, light from the object side passes through a first lens L (lens L[LS1o]), a first lens substrate LS1, and a second lens L2 (lens L[LS1m]) in this order. Of the light incident on the first lens L1, short wavelength light is, as it advances, refracted more than long wavelength light. Thus, when the short and long wavelength lights having passed through the first lens L1 are incident on the object-side substrate surface of the first lens substrate LS1, the angle of incidence of short wavelength light is larger than that of long wavelength light.

Here, because the index of refraction N of the first lens substrate LS1 [LS1] is higher than the index of refraction N of the first lens L1, i.e. the lens L[LS1o], according to Snell's law, the angle of emergence at which short wavelength light emerges from the object-side substrate surface of the first lens substrate LS1 is smaller than the angle of incidence at which it is incident on the object-side substrate surface of the first lens substrate LS1. Needless to say, the same applies to long wavelength light.

The difference in index of refraction between the first lens L1 and the first lens substrate LS1 with respect to short wavelength light is greater than the difference in index of refraction between the first lens L1 and the first lens substrate LS1 with respect to long wavelength light (in short, of the short and long wavelength lights incident from the first lens L1 on the first lens substrate LS1, the short wavelength light is refracted more).

Accordingly, the optical path LW2 of the long wavelength light traveling in the first lens substrate LS1 is, as it advances, refracted to deviate slightly toward the peripheral edge of the first lens substrate LS1 as compared with the optical path LW1. On the other hand, the optical path SW2 of the short wavelength light traveling in the first lens substrate LS1 is, as it advances, refracted to deviate greatly toward the peripheral edge of the first lens substrate LS1 as compared with the optical path SW1.

As a result, the optical path displacement between the short and long wavelength lights (see SW2 and LW2) traveling in the first lens substrate LS1 is smaller than the optical path displacement between the short and long wavelength lights (see SW1 and LW1) as observed when they travel in air in the absence of the first lens substrate LS1. Thus, in an imaging lens LN fulfilling conditional formula (D2), chromatic aberration arising from a difference in light wavelength is corrected.

In an imaging lens LN including a lens L[LS1o] whose object-side lens surface is convex, it is preferable that conditional formula (D3) below be fulfilled. Conditional formula (D3) defines the ratio of the Abbe number of the lens L[LS1o] to the Abbe number of the first lens substrate LS1, and in short signifies that the Abbe number of the lens L[LS1o] is equal to or greater than that of the first lens substrate LS1.

$$1<v[L[LS1o]<v[LS1] \tag{D3}$$

where
 v[LS1] represents the Abbe number of the first lens substrate LS1; and
 v[L[LS1o]] represents the Abbe number of the lens L[LS1o].

An Abbe number is a value indicating the dispersion of a material, and specifically is the ratio of the difference between the index of refraction nF for blue light with a wavelength of 486.1 nm (F-line) and the index of refraction nC for red light with a wavelength of 656.3 nm (C-line) to the difference between the index of refraction for yellow light with a wavelength of 587.6 nm (d-line) and the index of refraction of air. A small Abbe number signifies a large difference between the index of refraction for F-line and the index of refraction for C-line. This means that short wavelength light is refracted comparatively greatly.

Thus, with an imaging lens LN fulfilling conditional formula (D3), as in a case where conditional formula (D2) is fulfilled, chromatic aberration is corrected. Needless to say, it is further preferable that an imaging lens LN fulfill conditional formulae (D2) and (D3) simultaneously.

However, other than imaging lenses LN fulfilling conditional formulae (D2) and (D3), there still are imaging lenses LN that are manufactured easily and inexpensively and yet correct chromatic aberration. Examples are imaging lenses LN fulfilling conditional formula (DD1) and (DD2) below. Conditional formula (DD1) defines the ratio of the index of refraction of the first lens substrate LS1 to the index of refraction of the lens L[LS1o], and in short signifies that the index of refraction of the first lens substrate LS1 is smaller than that of the lens L[LS1o].

$$N[LS1]/N[L[LS1o]]<1 \tag{DD1}$$

$$40 \leq v[LS1] \tag{DD2}$$

where
 N[LS1] represents the index of refraction of the first lens substrate LS1;
 N [L[LS1o]] represents the index of refraction of the lens L[LS1o]; and
 v[LS1] represents the Abbe number of the first lens substrate LS1.

Figure 14:
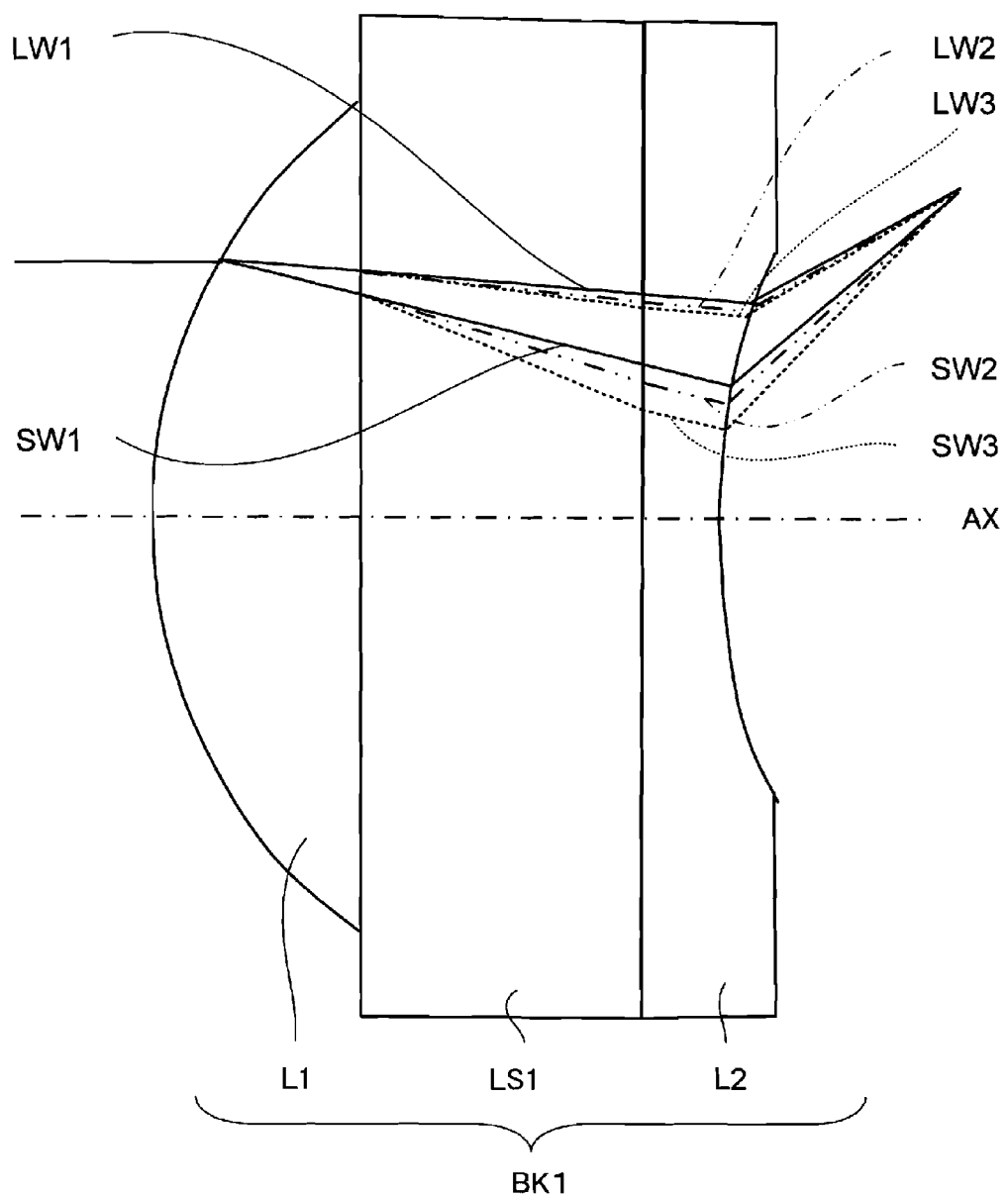
FIG. 14 is a sectional diagram of another lens block used for an explanation, different from the one shown in FIG. 13.

Conditional formula (DD2) will now be described with reference to FIG. 14. FIG. 14, like FIG. 13, shows the lens block 1. In FIG. 14, the solid lines SW1 and LW1 represent, for a case where the lens substrate LS1 is absent, the optical paths of short wavelength light and long wavelength light, respectively. The dash-dot-dot lines SW2 and LW2 represent, for a case where a lens substrate LS1 fulfilling conditional formula (DD2) is present, the optical paths of short wavelength light and long wavelength light, respectively. The doted line SW3 and LW3 represent, for a case where a lens substrate LS1 not fulfilling conditional formula (DD2) is present, the optical paths of short wavelength light and long wavelength light, respectively.

As described previously, of the light incident on the first lens L1 (lens L[LS1o]), short wavelength light is, as it advances, refracted more than long wavelength light; thus, when the short and long wavelength lights having passed through the first lens L1 are incident on the object-side substrate surface of the first lens substrate LS1, the angle of incidence of short wavelength light is larger than that of long wavelength light.

Since the index of refraction N[LS1] of the first lens substrate LS1 is lower than the index of refraction N[L[LS1o]] of the first lens L1, according to Snell's law, the angle of emergence at which short wavelength light emerges from the object-side substrate surface of the first lens substrate LS1 is larger than the angle of incidence at which it is incident on the objective-side substrate surface of the first lens substrate LS1. Needless to say, the same applies to long wavelength light.

If, in addition, the Abbe number here is comparatively small, the band of light formed between the optical path SW3 of short wavelength light and the optical path LW3 of long wavelength light widens as it approaches the image side of the first lens substrate LS1 (i.e., the optical path displacement between the optical path SW3 and the optical path LW3 increases). As a result, notable chromatic aberration occurs.

However, when conditional formula (DD2) is fulfilled, the band of light formed between the optical path SW2 of the short wavelength light and the optical path LW2 of the long wavelength light does not widen as much as the band of light formed between the optical path SW3 of the short wavelength light and the optical path LW3 of the long wavelength light. That is, the optical path displacement between the optical path SW2 and the optical path LW2 does not increase excessively. Thus, with an imaging lens LN fulfilling conditional formulae (DD1) and (DD2), as with an imaging lens LN fulfilling at least one of conditional formulae (D2) and (D3), chromatic aberration attributable to a difference in light wavelength is corrected.

In the imaging lens LN, it is preferable that conditional formula (D4) below be fulfilled. Conditional formula (D4) defines the thickness of the first lens substrate LS in terms of the optical total length.

$$0.03 \leq d[LS1]/TL \leq 0.33 \tag{D4}$$

where
  d[LS1] represents the thickness of the first lens substrate LS1 along the optical axis; and
  TL represents the distance from the most object-side surface in the imaging lens LN to the imaging surface along the optical axis.

If the value of conditional formula (D4) is less than the lower limit, the first lens substrate LS1 is so thin that the first lens block BK1 is difficult to manufacture. Moreover, in a case where the first lens substrate LS1 is formed thin by grinding a commercially available glass plate, the cost of the amount of material so ground is wasted. Moreover, the too thin first lens substrate LS1 may necessitate increasing the thicknesses of the lenses L[LS1o] and L[LS1m] with expensive resin, leading to an increased cost of the first lens block BK1 (and hence of the imaging lens LN).

By contrast, if the value of conditional formula (D4) is more than the upper limit, the first lens substrate LS1 is too thick, and hence the first lens block BK1 is too thick. The excessive thicknesses here lead to an increased astigmatic difference.

Moreover, in a three-or-less-element, compact optical system, it is preferable that the most object-side lens be a meniscus lens convex to the object side as disclosed in JP-A-2006-91638 and JP-A-2006-98504. If the first lens substrate LS1 is too thick as mentioned above, however, the first lens block BK1 has a shape far from a thin meniscus shape. This imposes restrictions on the design, in connection with aberration correction, of the imaging lens LN (in short, such an imaging lens LN has low aberration correction performance). In addition, an imaging lens LN including such a first lens block BK1 is unsuitable as a wide-angle lens system.

Thus, when the value of conditional formula (D4) falls within the range from the lower limit to the upper limit, the imaging lens LN is manufactured inexpensively, and in addition is compact and has high performance. It is particularly preferable that, within the conditional range defined by conditional formula (D4), the conditional range defined by conditional formula (D4a) below be fulfilled.

$$0.065 \leq d[LS1]/TL \leq 0.19 \tag{D4a}$$

In an imaging lens LN fulfilling conditional formulae (D2) and (D3), and in an imaging lens LN fulfilling conditional formulae (DD1) and (DD2), fulfilling conditional formula (D4) helps properly restrict the widening of the band of light formed (the dispersion of light occurring), when light passes through the first lens substrate LS1, between the optical path SW2 of short wavelength light and the optical path LW2 of long wavelength light.

Moreover, in the imaging lens LN, it is preferable that it include at least one lens block BK in which lenses L are contiguous with both the object-side and image-side substrate surfaces of a lens substrate LS. In addition, it is preferable that the lens block BK including those three optical devices fulfill the conditional formula below. Conditional formula (D5) defines the difference in Abbe number between the lenses L sandwiching the lens substrate LS from both sides (here, the difference is in absolute terms).

$$10 < |v[L[LSo]] - v[L[LSm]]| \tag{D5}$$

where
  v[L[LSo]] represents, in a lens block in which lenses L are contiguous with both the object-side and image-side substrate surfaces of a lens substrate, the Abbe number of the lens contiguous with the object-side substrate surface of the lens substrate; and
  v[L[LSm]] represents, in the lens block in which lenses L are contiguous with both the object-side and image-side substrate surfaces of a lens substrate, the Abbe number of the lens contiguous with the image-side substrate surface of the lens substrate.

Generally, correction of chromatic aberration in an imaging lens LN is achieved by use of a combination of lenses formed out of different materials and thus having different Abbe numbers, etc. Thus, in the imaging lens LN, a lens block BK preferably includes two lenses L having Abbe numbers that differ by more than 10 in absolute terms. The imaging lens then corrects chromatic aberration.

A lens block BK included in the imaging lens LN needs to have optical performance comparable with that of a conventional, normal lens system (normal lens) formed of glass or resin. Generally, in a case where attention is paid to telecentricity to the image surface in a normal lens, it is preferable that the aperture stop be located at the most object-side position.

Inconveniently, however, when the aperture stop is located at the most object-side position, then, with respect to the aperture stop, no optical symmetry is established between a lens surface located to the object side and a lens surface located to the image side thereof (for example, if an aperture stop is located near the middle of the optical total length of a normal lens and in addition if, with respect to the aperture stop, a lens surface located to the object side thereof is convex to the object side and a lens surface located to the image side thereof is convex to the image surface, symmetry can be said to be established).

In cases where no such symmetry is established, normal lenses suffer from degraded aberration performance (in short, aberrations are difficult to correct near the aperture stop on either side of it). As a solution to this, for example, JP-A-2006-91638 and JP-A-2006-98504 disclose a normal lens in which the most object-side lens is a meniscus lens convex to the object side and the object-side lens surface of this meniscus lens is given a comparatively small radius of curvature.

In this normal lens, despite its being a wide-angle lens system, even when an interlens aperture stop is adopted, the aperture stop is located to the object side. As a result, this normal lens is telecentric to the image surface and simultaneously secures optical symmetry between the object side and the image side with respect to the aperture stop position.

In the case of a lens block BK, however, especially in the case of a lens block BK including a lens substrate LS in the form of a plane-parallel plate, due to processing-related restrictions, the lens substrate LS needs to have a certain thickness and cannot be made sufficiently thin. Thus a lens block BK including a lens substrate LS cannot be formed into a meniscus shape with a thickness smaller than that of the lens substrate LS.

Accordingly, in such a lens block BK, locating an aperture stop ape further to the object side of an object-side lens L (for example, the first lens L1) with respect to the lens substrate LS, or locating an aperture stop ape further to the image side of an image-side lens L (for example, the first lens L2) with respect to the lens substrate LS, results in the lens block 13K having degraded optical performance than a normal lens.

For example, one example of the degraded optical performance resulting from an aperture stop ape being located to the object side of the first lens L1 is astigmatism. Astigmatism arises from the ratio between the angle of incidence on a lens surface (with respect to a normal to it) and the angle of emergence from it varying with image height. What is particular about astigmatism is that it deteriorates as astigmatic difference increases mainly at periphery (off the optical axis) according to formula (AFC) below (it should be noted that formula (AFC) is a general formula for comparatively thick lenses).

$$(d/2n)\cdot(1-\cos^2 U/\cos^2 U')\cdot(\cos U-\cos U') \quad (AFC)$$

where
d represents the thickness of the lens;
n represents the index of refraction of the lens;
U represents the angle of incidence on the lens; and
U' represents the angle of emergence from the lens.

Locating the aperture stop ape to the object side of the first lens L1 not only results in degraded optical performance as described above, but also results in higher sensitivity to the off-axial eccentric error of the imaging lens LN. The sensitivity to the off-axial eccentric error is one of the different types of sensitivity of the imaging lens LN to the manufacturing errors, and denotes the amount of one-sided blur occurring on the imaging surface when the imaging lens LN has shift eccentricity.

Such increased sensitivity to the off-axial eccentric error is attributable to a comparatively long distance between the center of curvature of a lens L to an aperture stop ape. Generally, a comparatively short distance between the center of curvature of a lens L to an aperture stop ape permits the light passing through the aperture stop ape to be incident on the lens surface comparatively perpendicularly; this leads to reduced ray trajectory deviations attributable to eccentricity, leaving the optical performance little affected.

By contrast, a comparatively long distance between the center of curvature of a lens L to an aperture stop ape makes it difficult for the light passing through the aperture stop ape to be incident on the lens surface perpendicularly; this leads to increased ray trajectory deviations attributable to eccentricity, affecting the optical performance.

On the other hand, locating an aperture stop ape to the image side of the second lens L2 leads to degraded telecentricity to the image surface. This degradation relates to compact lens systems.

For example, consider an imaging lens LN whose optical total length is approximately equal to its focal length and whose focal length is approximately twice the image height. In this imaging lens LN, when an aperture stop ape is disposed at the center of the optical system, the rays with the maximum angle of view (the maximum image height), when traveling from the position of the aperture stop ape to the image surface, are incident on the sensing surface of the image sensor SR at an angle of incidence larger than the angle of view.

This results in an increased angle of incidence on the image surface. Moreover, this angle of incidence is larger than the limit angle of incidence on the lens array in front of the sensing surface of the image sensor SR; this causes rays to be vignetted, leading to insufficient illuminance at periphery.

In light of the foregoing, locating an aperture stop ape inside the first lens block BK1 (particularly preferably inside the first lens substrate LS1) helps realize an imaging lens LN that is telecentric to the image surface and that in addition has satisfactory aberration correction performance. One condition to be fulfilled to realize such an imaging lens LN is conditional formula (D6) below. Conditional formula (D6) defines the location of an aperture stop ape.

$$0 \leq DT[LS1o-\text{ape}]/d[LS1] \leq 1 \quad (D6)$$

where
DT[LS1o–ape] represents the distance from the object-side substrate surface of the first lens substrate LS1 to the aperture stop surface (here a distance from the object-side substrate surface of the first lens substrate LS1 to the image side is assumed to be "positive" and one to the object side is assumed to be "negative"); and
d[LS1] represents the thickness of the first lens substrate LS1 along the optical axis.

If the value of conditional formula (D6) is less than the lower limit, the aperture stop ape is located to the object side of the object-side substrate surface of the first lens substrate LS1, resulting in a comparatively long distance between the center of curvature of the lens L[LS1o] and the aperture stop ape. This makes the sensitivity of the imaging lens LN to the off-axial eccentric error higher, and thus makes the surface accuracy required on the lens L extremely high. This makes the manufacture of the imaging lens LN difficult.

By contrast, if the value of conditional formula (D6) is more than the upper limit, the aperture stop ape is located to the image side of the image-side substrate surface of the first lens substrate LS1. That is, the aperture stop ape is then located excessively close to the image side. This leads to lower telecentricity to the image surface.

Thus, when the value of conditional formula (D6) falls within the range from the lower limit to the upper limit, the imaging lens LN is manufactured comparatively easily and inexpensively, and the manufactured imaging lens LN has high performance (for example, high aberration correction performance) despite being comparatively compact.

More specifically, this imaging lens LN, without inclusion of a diffractive surface, shortens the optical total length relative to the image height and corrects aberrations satisfactorily. Even when the imaging lens LN includes two or more lens blocks BK, these lens blocks BK include lens substrates LS with reduced sensitivity to manufacturing errors. Thus, even such an imaging lens LN including two lens blocks BK can be manufactured easily and inexpensively, and in addition is compact and has high performance.

When such an imaging lens LN is incorporated in an imaging device LU, the imaging device LU can be manufactured inexpensively, and in addition is compact and has high performance. Needless to say, the same applies when such an imaging device LU is incorporated in a portable terminal CU. Specifically, then a portable terminal CU is realized that is slim, lightweight, and compact but that nevertheless is inexpensive and has high performance and high functionality.

These benefits in respect of the imaging lens LN are obtained even by fulfilling conditional formula (D6a) below.

$$0 < DT[LS1o\text{-}ape]/d[LS1] \leq 1 \tag{D6a}$$

Moreover, it is preferable that the aperture stop ape be a light-shielding film. Such an aperture stop ape in the form of a film can be formed, for example, on a substrate surface (the object-side or image-side substrate surface) of the first lens substrate LS1 by application or vacuum evaporation.

In addition, forming the aperture stop ape by application or vacuum evaporation makes it comparatively thin. It is particularly preferable that conditional formula (D7) below be fulfilled.

$$d[ape] < 25 \tag{D7}$$

where
d[ape] represents the thickness of the aperture stop in the optical axis direction (in the unit of μm).

That is, it is preferable that the thickness of the aperture stop ape in the optical axis direction be less than 25 μm (it is more preferable that the thickness of the aperture stop ape in the optical axis direction be less than 10 μm; i.e. $d[ape] \leq 10$ μm). With this design, reflection near the edge of the aperture stop ape is less likely. Thus no stray light attributable to reflection there is produced in the imaging lens LN. In the imaging lens LN of any of the practical examples, the aperture stop ape has a thickness fulfilling conditional formula (D7) below.

Moreover, when the aperture stop ape is formed on the object-side substrate surface of the first lens substrate LS1, that is, when the value of conditional formula (D6) equals zero (equals the lower limit), it is preferable that the object-side lens surface of the lens L[LS1o] be convex to the object side.

With this design, the aperture stop ape is located comparatively to the object side, leading to improved telecentricity to the image surface. In addition, owing to the object-side lens surface of the lens L[LS1o] being convex to the object side, it is easy to secure optical symmetry between the object side and the image side with respect to the aperture stop position.

In an imaging lens LN including a first lens block BK1 alone as an optical device exerting an optical power (for example, a lens block BK), it is preferable that only a lens L[LS1m] be contiguous with the image-side substrate surface of the first lens substrate LS1. In this imaging lens LN, it is preferable that an aperture stop ape, the first lens substrate LS1, and the lens L[LS1m] be arranged in this order from the object side to the image side, and that the image-side lens surface of the lens L[LS1m] be convex to the image side.

This design uses the smallest number of lens blocks BK, realizing a simple and compact imaging lens LN. With no lens L contiguous with the object-side substrate surface of the first lens substrate LS1, an aperture stop ape is formed easily on the object-side substrate surface (for example, the aperture stop ape is formed easily by application or vacuum deposition).

Even with such an imaging lens LN, when conditional formula (D4) noted above is fulfilled, the imaging lens LN is manufactured inexpensively, and in addition is compact and has high performance.

Even in such an imaging lens LN, when the image-side lens surface of the lens L[LS1m] is convex to the image side and aspherical, the focal length of the image-side lens surface of the lens L[LS1m] is comparatively long, and thus curvature of field is corrected. If the imaging lens LN does not correct distortion sufficiently, then it is corrected by use of the image processing function of the portable terminal CU that incorporates the imaging lens LN.

An imaging lens LN including at least two lens blocks BK, namely a first lens block BK1 and a second lens block BK2, is preferably configured as follows. Specifically, it is preferable that, in the first lens block1, the object-side lens surface of the lens L[LS1o] be convex to the object side, and that, in the second lens block BK2, the object-side lens surface of the lens L[LS2o] be concave to the object side.

With this design, the Petzval sum defined by formula (PS) below is small. This is because the focal length of the object-side convex surface of the object-side lens surface of the lens L[LS1o] and the focal length of the object-side concave surface of the object-side lens surface of the lens L[LS2o] are in a mutually canceling relationship. When the Petzval sum is zero, the paraxial image surface has a curvature of zero and is thus planar, providing an ideal surface.

[Formula PS]

$$\sum_j \frac{1}{f_j n_j} \tag{PS}$$

where
fj represents the focal length of the jth lens surface as counted from the object side; and
nj represents the index of refraction of the lens material forming the jth lens surface as counted from the object side.

Moreover, the object-side concave surface of the lens L[LS2o] receives light in the process of being made to converge by the object-side convex surface of the lens L[LS1o] (with a positive optical power). Thus, the object-side concave surface of the lens L[LS2o] corrects aberrations for each of different parts of the light beam before it comes to have its minimal size, correcting aberrations even at the peripheral edge of the light beam.

Moreover, the distance from the object-side convex surface of the lens L[LS1o] to the object-side concave surface of the lens L[LS2o] is neither too small nor too large. Thus, much freedom is allowed in the curvature of the object-side concave surface of the lens L[LS2o], save the restrictions imposed by the positive optical power exerted by the object-side convex surface of the lens L[LS1o]. This makes it easy to design the lens L[LS2o] for a Petzval sum closer to zero.

An imaging lens LN including only a first lens block BK1 and a second lens block BK2 as optical devices having an optical power (for example, lens blocks BK) is preferably configured as follows. Specifically, the lens blocks BK1 and BK2 are preferably configured as follows.

In the first lens block BK1, a lens L[LS1o], a first lens substrate BK1, and a lens L[LS1m] are arranged in this order from the object side to the image side. In the second lens block BK2, a lens L[LS2o] and a second lens substrate LS2 are arranged in this order from the object side to the image side.

Moreover, in this imaging lens LN, it is preferable that the object-side lens surface of the lens L[LS1o] be convex to the object side, that the image-side lens surface of the lens L[LS1m] be convex to the image side, and that the object-side lens surface of the lens L[LS2o] be concave to the object side.

With such a first lens block BK1, even when it exerts a positive optical power equal to that exerted by a first lens block BK1 including, for example, a lens L[LS1o] whose object-side lens surface is convex to the object side and a lens L[LS1m] whose image-side lens surface is other than convex to the image side, it is possible to reduce the optical power of the object-side convex surface of the lens L[LS1o]. That is, it is possible to distribute the optical power for which the first lens block BK1 exerting a positive optical power is responsible between the object-side convex surface of the lens L[LS1o] and the image-side convex surface of the lens L[LS1m].

This permits a lens responsible for an accordingly low optical power, for example the lens [LS1o], to have a comparatively large radius of curvature, resulting in the lens [LS1o] having a smaller volume. Reducing the volume of the lens L[LS1o] in this way, for example when it is formed out of expensive resin, helps reduce its cost.

In addition, a lens L with a comparatively large radius of curvature is comparatively easy to manufacture, and is also easy to evaluate in terms of its performance in various aspects (for example, the sensitivity to an off-axial eccentric error). Moreover, a lens with a comparatively low optical power produces less aberrations of various kinds attributable to the optical power; thus, an imaging lens LN including such a lens L corrects aberrations of various kinds efficiently.

In this imaging lens LN, the focal length of the lens block BK1 and the focal length of the object-side lens surface (concave to the object side) of the lens L[LS2o] are in a mutually canceling relationship, and thus the Petzval sum is small.

An imaging lens LN including at least two lens blocks BK in total by including in addition to a first lens block BK1 exerting a positive optical power another lens block BK is preferably configured as follows. Specifically, it is preferable that, in the first lens block BK1, the image-side lens surface of the lens L[LS1m] be concave to the image side.

This design shifts the front principal point to the object side. This reduces the total length of the imaging lens LN. In addition, when the object-side lens surface of the lens L[LS1o] is convex to the object side, the Petzval sum is small. This is because the focal length of the object-side convex surface of the object-side lens surface of the lens L[LS1o] and the focal length of the image-side concave surface of the image-side lens surface of the lens L[LS1m] are in a mutually canceling relationship.

An imaging lens LN including only a first lens block BK1 and a second lens block BK2 as lens blocks BK is preferably configured as follows. Specifically, the lens blocks BK1 and BK2 are configured as follows.

In the first lens block BK1, a lens L[LS1o], a first lens substrate BK1, and a lens L[LS1m] are arranged in this order from the object side to the image side. In the second lens block BK2, a lens L[LS1o] and a second lens substrate BK2 are arranged in this order from the object side to the image side. The object-side lens surface of the lens L[LS1o] is convex to the object side, the image-side lens surface of the lens L[LS1m] is concave to the image side, and the object-side lens surface of the lens L[LS2o] is concave to the object side.

With this design, the focal length of the object-side lens surface (convex to the object side) of the lens L[LS1o] is in a canceling relationship with the focal length of image-side lens surface (concave to the image side) of the lens L[LS1m] and the focal length of the object-side lens surface (concave to the object side) of the lens L[LS2o], and thus the Petzval sum is small.

In an imaging lens LN including two lens blocks BK1 and BK2, it is preferable that conditional formula (D8) below be fulfilled. Conditional formula (D8) defines the sum of the aerial distances between the lens blocks BK in terms of the optical total length.

$$Ar/TL \leq 0.5 \tag{D8}$$

where

Ar represents the sum of the aerial distances between adjacent lens blocks BK in the imaging lens LN (also counted as an aerial distance is the thickness of any optical device having no optical power other than a lens block BK, as given as an equivalent thickness in air); and TL represents the distance from the most object-side surface in the imaging lens LN to the imaging surface along the optical axis.

A compact imaging lens LN fulfilling conditional formula (D8), when integrated with an imaging sensor SR, forms a compact module (camera module). The camera module is fitted on a printed circuit board (circuit board) having solder paste printed on it, and is then heated (for reflow soldering); thereby the module is mounted on the printed circuit board.

In such reflow soldering for mounting, the imaging lens LN is placed in an environment close to 300° C. (about 250 to 280° C.). Thus, as shown in FIG. 12C, the air sealed between the lens blocks BK by the spacer member B1 expands. If the air expands excessively, the lens blocks may separate from each other, and thus the imaging lens LN may break.

To prevent such breakage of the imaging lens LN, it is preferable that the imaging lens fulfill conditional formula (D8). Specifically, it is preferable that the aerial distance in the imaging lens LN be as short as possible. It is particularly preferable that, within the conditional range defined by conditional formula (D8), the conditional range defined by conditional formula (D8a) below be fulfilled. Within this conditional range, the air confined inside the imaging lens LN when it is sealed is sufficiently small.

$$Ar/TL \leq 0.45 \tag{D8a}$$

Preferably, an imaging lens LN including only a first to a third lens block BK1 to BK3 as lens blocks is configured as follows. Specifically, the lens blocks BK1 to BK3 are preferably configured as follows.

In the first lens block BK1, a lens L[LS1o], a first lens substrate LS1, and a lens L[LS1m] are arranged in this order from the object side to the image side. In the second lens block BK2, a lens L[LS2o] and a second lens substrate LS2 are arranged in this order from the object side to the image side. In the third lens block BK3, a lens L[LS3o], a third lens substrate LS3, and a lens L[LS3m] are arranged in this order from the object side to the image side.

Moreover, it is preferable that the object-side lens surface of the lens L[LS1o] be convex to the object side, that the image-side lens surface of the lens L[LS1m] be concave to the image side, that the object-side lens surface of the lens L[LS2o] be concave to the object side, and that the object-side lens surface of the lens L[LS3o] and the image-side lens surface of the lens L[LS3m] be aspherical.

With this design, the light (light beam) incident from the object side of the lens L[LS1o], whose object-side surface is convex to the object side, is first made to converge, and is then, by various surfaces located to the image side of the lens L[LS1o], made to diverge from the optical axis and thereby separated into parts at different image heights. Thus, for example, the lens surfaces correct aberrations for each of the separated parts of the light beam.

Moreover, the focal length of the object-side lens surface (convex to the object side) of the lens L[LS1o] is in a canceling relationship with the focal length of the image-side lens surface (concave to the image side) of the lens L[LS1m] and the focal length of the object-side lens surface (concave to the object side) of the lens L[LS2o], and thus the Petzval sum is small.

Here, suppose that, from the perspective of aberration correction, a lens L[LS2m] is contiguous with the second lens substrate LS2. Then, of the lens L[LS2m], the lens L[LS3o], and the lens L[LS3m], the lens L[LS2m] is located comparatively to the object side; thus, at the image-side lens surface of the lens L[LS2m], the light beam is not separated into parts at different image heights.

Thus, in the second lens block BK2, absence of the lens L[LS2m] little affects aberration correction. That is, even when a lens L[LS2m] is contiguous with the image-side substrate surface of the second lens substrate LS2, the lens L[LS2m] does not contribute to the aberration correction as much as the lens L[LS2o]. Thus, the second lens block BK2 includes the lens L[LS2o] alone, whose object-side lens surface is concave to the object side.

The object-side concave surface of the lens L[LS2o] receives light in the process of being made to converge with the positive optical power of the first lens block BK1. Thus, the object-side concave surface of the lens L[LS2o] corrects aberrations for each of different parts of the light beam before it comes to have its minimal size, correcting aberrations even at the peripheral edge of the light beam.

Moreover, the distance from the object-side convex surface of the lens L[LS1o] to the object-side concave surface of the lens L[LS2o] is neither too small nor too large. Thus, much freedom is allowed in the curvature of the object-side concave surface of the lens L[LS2o], save the restrictions imposed by the positive optical power exerted by the object-side convex surface of the lens L[LS1o]. This makes it easy to design the lens L[LS2o] for a Petzval sum closer to zero.

The parts of the light beam at different image heights reaching the third lens block BK3 are more separated than the parts of the light beam at different image heights reaching the other lens blocks BK1 and BK2. Thus, when the object-side lens surface of the lens L[LS3o] and the image-side lens surface of the lens L[LS3m] are aspherical, curvature of field and astigmatism are efficiently corrected.

An imaging lens LN including only a first to a fourth lens block BK1 to BK4 as lens blocks BK is preferably configured as follows. Specifically, the lens blocks BK1 to BK4 are configured as follows.

In the first lens block BK1, a lens L[LS1o], a first lens substrate LS1, a lens L[LS1m] are arranged in this order from the object side to the image side. In the second lens block BK2, a lens L[LS2o], a second lens substrate LS2, and a lens L[LS2m] are arranged in this order from the object side to the image side. In the third lens block BK3, a third lens substrate LS3 and a lens L[LS3m] are arranged in this order from the object side to the image side. In the fourth block BK4, a lens L[LS4o], a fourth lens substrate LS4, and a lens L[LS4m] are arranged in this order from the object side to the image side.

Moreover, it is preferable that the object-side lens surface of the lens L[LS1o] be convex to the object side, that the image-side lens surface of the lens L[LS1m] be concave to the image side, that the object-side lens surface of the lens L[LS2o] be concave to the object side, that the image-side surface of the lens L[LS3m] be aspherical, and that the object-side lens surface of the lens L[LS4o] and the image-side lens surface of the lens L[LS4m] be aspherical.

With this design, the light beam incident from the object side of the lens L[LS1o], whose object-side lens surface is convex to the object side, is first made to converge, and is then, by various surfaces located to the image side of the lens L[LS1o], made to diverge from the optical axis and thereby separated into parts at different image heights. Thus, the lens surfaces correct aberrations for each of the separated parts of the light beam.

Moreover, the focal length of the object-side lens surface (convex to the object side) of the lens L[LS1o] is in a mutually canceling relationship with the focal length of the image-side lens surface (concave to the image side) of the lens L[LS1m] and the focal length of the object-side lens surface (concave to the object side) of the lens L[LS2o], and thus the Petzval sum is small. Incidentally, since the object-side lens surface of the lens L[LS2o] is aspherical, this aspherical surface corrects aberrations of various kinds efficiently.

Here, suppose that, from the perspective of aberration correction, a lens L[LS3o] is contiguous with the third lens substrate LS3. Then, of the lens L[LS3o] and the lens L[LS3m], the lens L[LS3o] is located comparatively to the object side; thus, at the object-side lens surface of the lens L[LS3o], the light beam is not separated into parts at different image heights.

Thus, in the second lens block BK2, absence of the lens L[LS3o] little affects aberration correction. That is, even when a lens L[LS3o] is contiguous with the image-side substrate surface of the second lens substrate LS3, the lens L[LS2o] does not contribute to the aberration correction as much as the lens L[LS3m]. Thus, the third lens block BK3 includes the lens L[LS3m] alone, whose image-side lens surface is aspherical.

Moreover, the parts of the light beam at different image heights reaching the fourth lens block BK4 are more separated than the parts of the light beam at different image heights reaching the other lens blocks BK1 to BK3. Thus, when the object-side lens surface of the lens L[LS4o] and the image-side lens surface of the lens L[LS4m] are aspherical, curvature of field and astigmatism are efficiently corrected.

In an imaging lens LN including three lens blocks BK, and in an imaging lens LN including four lens blocks BK, it is preferable that conditional formulae (D9) and (D10) below be fulfilled. Conditional formula (D9) defines the ratio of the optical total length to the maximum image height in the imaging lens LN, and in short signifies that the imaging lens LN is compact with an optical total length not longer than twice the maximum image height. Conditional formula (D10) defines the sum of the aerial distances between the lens blocks BK in terms of the optical total length.

$$TL < Y' \leq 2.06 \qquad (D9)$$

$$Ar/TL \leq 0.6 \qquad (D10)$$

where
- TL represents the distance from the most objective-side surface in the imaging lens LN to the imaging surface along the optical axis;
- Y' represents the maximum image height; and
- Ar represents the sum of the aerial distances between adjacent lens blocks in the imaging lens LN (also counted as an aerial distance is the thickness of any optical device having no optical power other than a lens block BK, as given as an equivalent thickness in air).

When the imaging lens LN fulfills conditional formula (D10), it offers benefits similar to those it offers when it fulfills conditional formula (D8). It is preferable that, within the conditional range defined by conditional formula (D10), the conditional range defined by conditional formula (D10a) below be fulfilled. Within this conditional range, the air confined inside the imaging lens LN when it is sealed is sufficiently small.

$$Ar/TL \leq 0.4 \qquad (D10a)$$

On the assumption that the imaging lens LN is placed in a high temperature environment, it is preferable that the lens substrate LS be formed out of glass with comparatively high resistance to heat. It is particularly preferable that the glass be high-softening-point glass (the heat-resistance, etc. of the lens L will be described later).

Shown below in a table are, for each of the practical examples (EX1 to EX5), the results of conditional formulae (D1 to D10). It should be noted that conditional formula (D7) is excluded from the table, since Examples 1 to 5 all fulfills it. In the table, the symbol "x" signifies that no value corresponding to the relevant conditional formula can be calculated, and an underscored value signifies that the relevant condition is not fulfilled.

TABLE 11

|  | EX1 | EX2 | EX3 | EX4 | EX5 |
|---|---|---|---|---|---|
|  | $0.6 \leq f[BK1]/f[all] \leq 2.0 \ldots$ (D1) | | | | |
| D1 | 0.833 | 1.010 | 1.011 | 1.422 | 1.000 |
|  | $1 < N[LS1]/N[L[LS1o]] \ldots$ (D2) | | | | |
| D2 | 1.03 | 1.17 | 1.02 | 1.06 | x |
|  | $1 < v[L[LS1o]]/v[LS1] \ldots$ (D3) | | | | |
| D3 | 1.24 | 1.17 | 1.10 | <u>0.88</u> | x |
|  | $0.03 \leq d[LS1]/TL \leq 0.33 \ldots$ (D4) | | | | |
| D4 | 0.10 | 0.12 | 0.09 | 0.24 | 0.21 |
|  | $10 < |v[L[LSo]] - v[L[LSm]]| \ldots$ (D5) | | | | |
| D5 | 10.650 | 11.000 | 25.000 | 33.600 | x |
|  | $0 \leq DT[LS1o-ape]/d[LS1] \leq 1 \ldots$ (D6) | | | | |
| D6 | 0.00 | 0.19 | 0.00 | x | 0.00 |
|  | $Ar/TL \leq 0.5 \ldots$ (D8) | | | | |
| D8 | x | x | x | 0.300 | <u>0.680</u> |
|  | $TL/Y' \leq 2.06 \ldots$ (D9) | | | | |
| D9 | 1.81 | 1.71 | 1.83 | 2.53 | 2.36 |
|  | $Ar/TL \leq 0.6 \ldots$ (D10) | | | | |
| D10 | 0.390 | 0.340 | 0.220 | x | x |

[Embodiment 2]

Embodiment 2 will now be described. Such members as function similarly to their counterparts in Embodiment 1 are identified by common reference signs and no description of them will be repeated. In this embodiment, the resin out of which the lenses L are formed will be discussed.

Resin excels in workability. Thus, forming the lenses L enumerated in connection with Embodiment 1 out of resin allows easy formation of aspherical lens surfaces by use of molds or the like.

Generally, however, if fine particles are mixed in transparent resin (such as polymethyl methacrylate), light is scattered inside the resin, and lower transmittance results. Thus, resin containing fine particles can be said to be unsuitable as an optical material.

Moreover, the index of refraction of resin varies with temperature. For example, let us calculate, according to the Lorenz-Lorenz formula (LL) below, the temperature dependence of the index of refraction of polymethyl methacrylate (PMMA), that is, its temperature-dependent refractive-index variation (dn/dt).

[Formula LL]

$$\frac{dn}{dt} = \frac{(n^2+2) \times (n^2-1)}{6n} \times \left\{ (-3\alpha) + \frac{1}{[R]} \times \frac{\partial [R]}{\partial t} \right\} \qquad (LL)$$

where
- n represents the index of refraction of the resin;
- t represents temperature;
- α represents the coefficient of linear expansion (with PMMA, $\alpha = 7 \times 10^{-5}$); and
- [R] represents molecular refraction.

Then, with PMMA, the refractive-index variation is found to be $-1.2 \times 10^{-4}/°$ C. This value approximately agrees with actual measurements. Thus, forming the lenses L out of resin (plastic) alone results in their refractive-index variation being dependent on temperature. If, in addition, fine particles are mixed in such resin out of which the lenses are formed, the lenses L then not only scatter light but also change their indices of refraction with temperature.

In recent years, however, it has increasingly been recognized that resin containing properly designed fine particles can be used as an optical material. This is because, in resin containing fine particles (a mixed resin), if the particle diameter of the fine particles is smaller than the wavelength of transmitted light, no scattering of light occurs.

In addition, when the fine particles are inorganic ones, their index of refraction increases as temperature increases. Thus, in a mixed resin, as temperature rises, the index of refraction of the resin decreases and simultaneously the index of refraction of the inorganic fine particles increases. In this way, their respective temperature dependence (the decrease in the index of refraction of one and the increase in the index of refraction of the other) is canceled out, with the result that the index of refraction of the mixed resin varies less with temperature (for example, in the lenses L, the variation of their index of refraction is reduced to as small as the effect of the variation of the surface shape on the positions of the paraxial image points).

As one example of a mixed resin as described above, JP-A-2007-126636 discloses one having inorganic fine particles with a maximum length of 30 nm or less (an added material, such as niobium oxide ($Nb_2O_5$)) dispersed in resin (a base material).

In light of the foregoing, when the lenses L are formed out of resin having fine particles of 30 nm or less dispersed in it (a mixed resin), the imaging lens LN including those lenses L has high durability to temperature. Moreover, for example, by properly adjusting the ratio of resin to inorganic fine particles in the mixed resin, the length of the particle diameter of the inorganic fine particles (for example, 20 nm or less, further preferably 15 nm or less), the kind of resin used as the base material, and the kind of inorganic fine particles used as the added material, it is possible to give the lenses L high indices of refraction. Thus, when the lenses L are formed out of a mixed resin, the imaging lens LN including those lenses L is more compact, and the lenses L are less difficult to mold.

It is preferable that the resin mentioned above be a hardening resin. This is because a hardening resin allows easy manufacture of the lenses L including aspherical surfaces by use of molds or the like. Moreover, when the resin is adhesive (or when adhesive is mixed in the resin), the lenses L formed out of it can be cemented to the lens substrates LS easily. That is, the lens blocks including the lens substrates LS and lenses L directly bonded together are manufactured easily.

Furthermore, it is preferable that the resin mentioned above is heat-resistant. For example, a module (camera module) having the imaging lens LN and the image sensor SR integrated into a unit is fitted on a printed circuit board having solder paste printed on it, and is then heated (for reflow soldering); thereby the module is mounted on the printed circuit board. Such mounting is handled by automation. Thus, when the lenses L are formed out of a heat-resistant hardening resin, they withstand reflow soldering, and are therefore suitable for automation (needless to say, it is preferable that the lens substrates LS also be formed out of a material with high resistance to heat, for example, glass).

Examples of hardening resins include thermosetting resins and ultraviolet (UV)-curing resins.

With a thermosetting resin, even when the lenses L are comparatively thick, they are manufactured accurately. On the other hand, with an UV-curing resin, since it hardens in a comparatively short time, the lenses can be manufactured in a short time.

[Other Embodiments]

It should be understood that the embodiments specifically described above are not meant to limit the present invention, and that variations and modifications can be made within the spirit of the present invention.

For example, an imaging lens can be defined as follows.

An imaging lens at least includes, disposed to face an object: a first lens block having a positive refractive power; and a second lens block disposed to the image side of the first lens block and shaped to be concave to the object side, the imaging lens further having at least one lens block disposed to the image side of the second lens block.

In this imaging lens, of the lens blocks disposed to the image side of the second lens block, let the one disposed at the most image-side position from the second lens block be called the ith lens block ($i \geq 3$). The ith lens block includes: an ith lens substrate; and a lens that is formed on the object-side surface of the ith lens substrate, that has an index of refraction different from that of the ith lens substrate, and that is shaped to be convex to the object side in its part where the principal ray with the maximum image height passes.

That is, in the imaging lens, when it includes i lens blocks, the lens formed on the object-side surface of the ith lens substrate included in the ith lens block, i.e. the lens block disposed at the most image-side position, has a convex surface shape convex to the object side in its most off-axial part. This helps reduce the angle of incidence at which a peripheral light beam is incident on the lens formed on the image-side surface of the ith lens substrate. Accordingly, the lens formed on the image-side surface of the ith lens substrate does not need to reduce the angle of incidence on the image sensor. Thus, the amount of sag is reduced. As a result, a lens element in the ith lens flat plate may be thin, making it possible to make the entire imaging lens compact as a whole.

Moreover, since the object-side surface of the second lens block is shaped to be concave to the object side, in the imaging lens, astigmatism is corrected satisfactorily.

Moreover, when the ith lens block includes a lens substrate that is a plane-parallel pate, the lens substrate serves also as a cover glass, eliminating the need for a special cover glass. This makes the imaging lens compact.

Moreover, forming an infrared cut filter coating on a surface of a lens substrate easily permits the lens substrate to function as an infrared cut filter. That is, in the imaging lens, a coating of an infrared cut filter may be formed on a surface of a plane-parallel pate included in a lens block to allow a sensor cover glass to function as an infrared cut filter, this helps achieve a simple structure.

Moreover, in the imaging lens, it is preferable that conditional formula (F1) below be fulfilled. Conditional formula (F1) defines the focal length of the object-side surface of the first lens block.

$$0.6 \leq f[BK1]/f[\text{all}] \leq 1.3 \tag{F1}$$

where f[BK1] represents the focal length of the object-side lens surface of the object-side lens in the first lens block (it may be said to be the focal length of the first lens block as the case may be); and f[all] represents the focal length of the entire imaging lens.

If the ratio of the focal length of the first lens block to the focal length of the lens system is less than the lower limit of conditional formula (F1), it is difficult to correct spherical aberration and coma. By contrast, if the ratio is more than the upper limit of conditional formula (F1), the optical total length is too long. Thus, fulfilling conditional formula (F1) permits the imaging lens to have a short optical total length and satisfactory aberration performance.

Moreover, in the imaging lens, it is preferable that conditional formula (F2) below be fulfilled.

$$(|z - z_0|)/Y' < 0.16 \tag{F2}$$

where with respect to the image-side lens surface in the ith lens block, $$z \text{ equals } (c \cdot \rho^2)/\left[1 + \sqrt{1 - (1+K) \cdot c \cdot \rho^2}\right] + A \cdot \rho^4 + B \cdot \rho^6 + C \cdot \rho^8 + D \cdot \rho^{10} + E \cdot \rho^{12} + F \cdot \rho^{14} + G \cdot \rho^{16} + H \cdot \rho^{18} + I \cdot \rho^{20}$$

$$z_0 \text{ equals } (c \cdot \rho^2)/\left[1 + \sqrt{1 - (1+K) \cdot c \cdot \rho^2}\right]$$

where $\rho$ represents the height in a direction perpendicular to the z-axis (optical axis);

z represents the amount of sag along the optical axis at the height $\rho$ (relative to the vertex);

c represents the curvature (the reciprocal of the radius of curvature r) at the vertex;

K represents the conical constant; and

Y' represents the maximum image height.

In an optical system (imaging lens) having a short optical total length and fulfilling conditional formula (F1), if the value of conditional formula (2) is equal to or more than the upper limit, the amount of aspherical surface sag is so large that the lens portion needs to be made thick. Thus, an imaging lens fulfilling conditional formula (F2) facilitates formation of a mold for transferring an aspherical surface shape.

Moreover, in the imaging lens, the first lens block is a cemented lens formed with a lens exerting a positive refractive power and a lens exerting a negative refractive power. In the imaging lens, it is preferable that conditional formula (F3) below be fulfilled.

$$5<|\nu 1-\nu 2|<70 \qquad (F3)$$

where v1 represents the Abbe number of the lens exerting a positive refractive power in the first lens block; and v2 represents the Abbe number of the lens exerting a negative refractive power in the first lens block.

Conditional formula (F3) defines, in an imaging lens including a first lens block (cemented lens), as an optical element formed by cementing together a lens exerting a positive refractive power and a lens exerting a negative refractive power, the difference in Abbe number between the lens exerting a positive refractive power and the lens exerting a negative refractive power (here, in absolute terms). When conditional formula (F3) is fulfilled, aberrations can be corrected by use of the difference in Abbe number, and thus the imaging lens has satisfactory aberration correction performance.

Moreover, in the imaging lens, the first lens block includes a first lens substrate, and also includes a lens L[LS1o] (a first f lens element) formed on the object-side substrate surface of the first lens substrate and exerting a positive refractive power and a lens L[LS1m] (a second b lens element) formed on the image-side substrate surface of the first lens substrate and exerting a negative refractive power. In this imaging lens, it is preferable that conditional formula (F3') below be fulfilled.

$$5<|1-\nu 2|<70 \qquad (F3')$$

where v1 represents the Abbe number of the lens L[LS1o] exerting a positive refractive power in the first lens block; and v2 represents the Abbe number of the lens L[LS1m] exerting a negative refractive power in the first lens block.

Conditional formula (3') defines, for a case where the first lens block includes a lens substrate, the difference in Abbe number between the lenses L[LS1o] and L[LS1m] (here, in absolute terms). When conditional formula (F3') is fulfilled, as when conditional formula (F3) is fulfilled, aberrations in the imaging lens are corrected by use of the difference in Abbe number.

Using a plane-parallel plate as a lens substrate, since a plane-parallel plate is easy to mold, helps reduce the cost of the imaging lens, and also eliminates the need to select a position where to form a lens.

Moreover, in the imaging lens, it is preferable that it include at least one lens formed out of resin.

That is, in a case where a lens block in the imaging lens includes a lens substrate and in addition includes a lens L[LS1o] on the object-side substrate surface of the lens substrate and a lens L[LS1m] on the image-side substrate surface of the lens substrate, it is preferable that these lenses be formed out of resin. This design helps reduce the cost of the imaging lens, and makes the production of the imaging lens easy.

Moreover, in the imaging lens, it is preferable that all the lens blocks include a lens substrate having an index of refraction different from that of lenses.

Moreover, in the imaging lens, it is preferable that the lenses included in each lens block be formed out of an ultraviolet-curing resin, and that conditional formula (F4) below be fulfilled.

$$5<|\nu 1-\nu 2|<40 \qquad (F4)$$

where v1 represents the Abbe number of a lens exerting a positive refractive power in the first lens block or, in a case where the first lens block includes a lens substrate, the Abbe number of the lens L[LS1o] on the object side of the lens substrate; and v2 represents the Abbe number of a lens exerting a negative refractive power in the first lens block or, in a case where the first lens block includes a lens substrate, the Abbe number of the lens L[LS1m] on the image side of the lens substrate.

In the imaging lens, when the lenses L[LS1o] and L[LS1m] are formed out of resin, the upper limit of conditional formula (F4) and the kinds of selectable glass materials are restricted and are limited within the range defined by conditional formula (F4).

Further preferably, in respect of the lower limit of conditional formula (F4), for example, when the difference in Abbe number between the lens L[LS1o] exerting a positive refractive power and the lens L[LS1m] exerting a negative refractive power is equal to or more than 15, chromatic aberration is corrected satisfactorily.

By contrast, if the value of conditional formula (F4) is more than the upper limit, it is difficult to manufacture a lens block by combining resins superior in cost-effectiveness and mass-productivity.

Presented below is a numerical example required for conditional formulae (F1) to (F4) (here, in respect of Example 3 only).

The imaging lens of Example 3
 f[BK1]=3.23 [mm]
 f[all]=2.75 [mm]
 f[BK1]/f[all]=1.17455
 The amount of sag ($|z-z_0|$)=0.1 [mm]
 Y'=1.75 [mm]
 ($|z-z_0|$)/Y'=0.05714
 $|\nu 1-\nu 2|$=25

In a case where lenses are formed out of an ultraviolet-curing resin, first molding lenses on a glass flat plate and then irradiating them with ultraviolet light permits a large number of lens blocks to be manufactured at one time. Ultraviolet-curing resins work (match) well with the replica method. This is because using an ultraviolet-curing resin for lenses means that when the ultraviolet-curing resin is cured by the replica method, lens blocks themselves are cured thereby. In addition, those lens blocks transmit light well, permitting the radiated ultraviolet light to spread all over the ultraviolet-curing resin, thereby achieving smooth curing of the resin.

Ultraviolet-curing resins have excellent heat-resistance, and thus lens modules formed out of them withstand reflow soldering. They thus help greatly simplify the entire manufacturing process, and are suitable for mass-produced and thus inexpensive lens modules.

Conditional formula (F2) is effective even with the replica method using an ultraviolet-curing resin. That is, when the amount of aspherical surface sag is equal to or more than the upper limit of conditional formula (F2), portions formed out of the ultraviolet-curing resin are so thick that poor transmission of the ultraviolet light results. That is, the ultraviolet-curing resin is then hard to cure.

It is preferable that an aperture stop be easily formed by forming a light-shielding coating on one surface of the lens substrate (the object-side or image-side substrate surface). That is, when an aperture stop, which is conventionally provided separately between the first and second lenses, is formed by forming a light-shielding coating on a surface of a lens substrate, this eliminates the need for any other member and makes it easy to realize the function of an aperture stop easy.

Further preferably, the aperture stop is formed between the first lens substrate and the lens L[LS1o], or on the most object-side surface, so that it can mildly bend light and makes it reach the image surface more telecentrically (with the principle ray axis traveling parallel to the optical axis).

Moreover, when all the lens blocks in the imaging lens include a lens substrate, an infrared cut filter coating can be formed on a surface of one of the those lens substrates, allowing easy formation of the infrared cut filter.

Moreover, by making all the lens surfaces facing air aspherical, it is possible to realize an imaging lens having better aberration correction performance. That is, It is easier to correct aberrations with an aspherical-surfaced lens than with a spherical-surfaced lens. Moreover, it is easier to correct aberrations with a plurality of lens surfaces etc. than with a single such surface. Thus, an imaging lens including a number of aspherical lens surfaces corrects aberrations satisfactorily.

The invention claimed is:
1. An imaging lens comprising:
   at least one lens block including
      a lens substrate that is a plane-parallel plate, and
      a lens contiguous with at least one of object-side and image-side substrate surfaces of the lens substrate, the lens exerting a positive or negative optical power; and
   an aperture stop restricting light amount,
   wherein said lens included in said lens block is formed of a material different from a material of which said lens substrate is formed;
   wherein said lens block comprises a first lens block disposed at a most object-side position, the first lens block exerting a positive optical power,
   wherein said lens block comprises at least one lens block in which said lens is contiguous only with one of the object-side and image-side substrate surface of said lens substrate,
   wherein conditional formula (D1) below is fulfilled:

$$0.6 \leq f[BK1]/f[all] \leq 2.0 \quad (D1)$$

where
      f[BK1] represents a focal length of the lens block; and
      f[all] represent a focal length of the entire imaging lens,
      where in the first lens block includes, as said lens substrate, a first lens substrate and, as said lens, a lens L[LS1o] contiguous with an object-side substrate surface of the first lens substrate, an object-side surface of the lens L[LS1o] being convex to object side, and
   wherein conditional formula (D3) below is fulfilled:

$$1 < \nu[L[LSo]]/\nu[LS1] \quad (D3)$$

where
      $\nu$[LS1] represnts an Abbe number of the first lens substrate; and
      $\nu$[L[LS1o]] represnts an Abbe number of the lens L[LS1o].

2. An imaging lens comprising:
   at least one lens block including
      a lens substrate that is a plane-parallel plate, and
      a lens contiguous with at least one of object-side and image-side substrate surfaces of the lens substrate, the lens exerting a positive or negative optical power; and
   an aperture stop restricting light amount,
   wherein said lens included in said lens block is formed of a material different from a material of which said lens substrate is formed;
   wherein said lens block comprises a first lens block disposed at a most object-side position, the first lens block exerting a positive optical power, and
   wherein said lens block comprises at least one lens block in which said lens is contiguous only with one of the object-side and image-side substrate surface of said lens substrate,
   wherein the first lens block includes, as said lens substrate, a first lens substrate and, as said lens, a lens L[LS1o] contiguous with an object-side substrate surface of the first lens substrate, an object-side surface of the lens L[LS1o] being convex to an object side,
   wherein conditional formula (D2) below is fulfilled:

$$1 \leq N[LS1]/N[L[LS1o]] \quad (D2)$$

where
      N [LS1] represents an index of refraction of the first lens substrate; and
      N[L[LS1o]] represents an index number of the lens L[LS1o].

3. An imaging lens comprising:
   at least one lens block including
      a lens substrate that is a plane-parallel plate, and
      a lens contiguous with at least one of object-side and image-side substrate surfaces of the lens substrate, the lens exerting a positive or negative optical power; and
   an aperture stop restricting light amount,
   wherein said lens included in said lens block is formed of a material different from a material of which said lens substrate is formed;
   wherein said lens block comprises a first lens block disposed at a most object-side position, the first lens block exerting a positive optical power, and
   wherein said lens block comprises at least one lens block in which said lens is contiguous only with one of the object-side and image-side substrate surface of said lens substrate,
   wherein the first lens block includes, as said lens substrate, a first lens substrate,
   wherein conditional formula (D4) below is fulfilled:

$$0.03 \leq d[LS1]/TL \leq 0.33 \quad (D4)$$

where
      [LS1] represents a thickness of the first lens substrate along the optical axis; and
      TL represents a distance from a most object-side surface in the imaging lens to an imaging surface along the optical axis.

4. The imaging lens according to claim 1,
   wherein said lens block comprises at least one lens block in which, as said lens, lenses are contiguous with both the object-side and image-side substrate surfaces of said lens substrate, wherein conditional formula (D5) below is fulfilled:

$$10 < |v[L[LSo]] - v[L[LSm]]| \quad (D5)$$

where
- v[L[LSo]] represents, in the lens block in which lenses are contiguous with both the object-side and image-side substrate surfaces of a lens substrate, an Abbe number of the lens contiguous with the object-side substrate surface; and
- v[L[LSm]] represents, in the lens block in which lenses are contiguous with both the object-side and image-side substrate surfaces of a lens substrate, an Abbe number of the lens contiguous with the image-side substrate surface.

5. The imaging lens according to claim 1, wherein the first lens block includes, as said lens substrate, a first lens substrate and, as said lens, a lens L[LS1o] contiguous with an object-side substrate surface of the first lens substrate, wherein conditional formula (D6) below is fulfilled:

$$0 \leq DT[LS1o\text{-ape}]/d[LS1] \leq 1 \quad (D6)$$

where
- DT[LS1o–ape] represents a distance from a most object-side substrate surface of the first lens substrate to an aperture stop surface; and
- d[LS1] represents a thickness of the first lens substrate along the optical axis.

6. The imaging lens according to claim 2, wherein the aperture stop is a light-shielding film, and is formed on one of object-side and image-side substrate surfaces of the first lens substrate, wherein conditional formula (D7) is fulfilled:

$$d[\text{ape}] < 25 \quad (D7)$$

where
- d[ape] represents a thickness of the aperture stop along the optical axis (in unit of μm).

7. The imaging lens according to claim 2, wherein the aperture stop is a light-shielding film, and is formed on an object-side substrate surface of the first lens substrate.

8. The imaging lens according to claim 1, wherein said lens block comprises the first lens block alone, wherein the first lens block includes, as said lens substrate, a first lens substrate and, as said lens, only a lens L[LS1m] contiguous with an image-side substrate surface of the first lens substrate,
wherein the aperture stop, the first lens substrate, and the lens L[LS1m] are arranged in this order from an object side to an image side, and
wherein the an image-side lens surface of the lens L[LS1m] is convex to the image side.

9. The imaging lens according to claim 8, wherein conditional formula (D4) is fulfilled:

$$0.03 \leq d[LS1]/TL \leq 0.33 \quad (D4)$$

where
- d[LS1] represents a thickness of the first lens substrate along the optical axis; and
- TL represents a distance from a most object-side surface in the imaging lens to an imaging surface.

10. The imaging lens according to claim 1, wherein said lens block comprises at least two lens blocks, namely the first lens block and a second lens block, wherein the first lens block includes,
as said lens substrate, a first lens substrate, and
as said lens, a lens L[LS1o] contiguous with an object-side substrate surface of the first lens substrate, an object-side lens surface of the lens L[LS1o] being convex to an object side,
wherein the second lens block is located to an image side of the first lens block and includes,
as said lens substrate, a second lens substrate, and
as said lens, a lens L[LS2o] contiguous with an object-side substrate surface of the second lens substrate, an object-side lens surface of the lens L[LS2o] being concave to an object side.

11. The imaging lens according to claim 10, wherein said lens block comprises only the first and second lens blocks,
wherein the first lens block includes,
as said lens, a lens L[LS1m] contiguous with an image-side substrate surface of the first lens substrate,
wherein, in the first lens block, the lens L[LS1o], the first lens substrate, and the lens L[LS1m] are arranged in this order from an object side to an image side,
wherein, in the second lens block, the lens L[LS2o] and the second lens substrate are arranged in this order from the object side to the image side, and
wherein an image-side lens surface of the lens L[LS1m] is convex to the image side.

12. An imaging lens comprising:
at least one lens block including
a lens substrate that is a plane-parallel plate, and
a lens contiguous with at least one of object-side and image-side substrate surfaces of the lens substrate, the lens exerting a positive or negative optical power; and
an aperture stop restricting light amount,
wherein said lens included in said lens block is formed of a material different from a material of which said lens substrate is formed;
wherein said lens block comprises a first lens block disposed at a most object-side position, the first lens block exerting a positive optical power, and
wherein said lens block comprises at least one lens block in which said lens is contiguous only with one of the object-side and image-side substrate surface of said lens substrate,
wherein conditional formula (D1) below is fulfilled:

$$0.6 \leq f[BK1]/f[\text{all}] \leq 2.0 \quad (D1)$$

where
- f[BK1] represents a focal length of the first lens block; and
- f[all] represents a focal length of the entire imaging lens wherein said lens block comprises at least two lens blocks, wherein the first lens block includes,
as said lens substrate, a first lens substrate, and
as said lens, a lens L[LS1m] contiguous with an image-side substrate surface of the first lens substrate, an image-side lens surface of the lens L[LS1m] being concave to the image side.

13. The imaging lens according to claim 12, wherein said lens block comprises only two lens blocks, namely the first lens block and a second lens block,
wherein the first lens block further includes,
as said lens, a lens L[LS1o] contiguous with an object-side substrate surface of the first lens substrate,
wherein, in the first lens block, the lens L[LS1o], the first lens substrate, and the lens L[LS1m] are arranged in this order from an object side to an image side, wherein the second lens block is located to an image side of the first lens block and includes,
  as said lens substrate, a second lens substrate and, as said lens, a lens L[LS2o] contiguous with an object-side substrate surface of the second lens substrate,
wherein, in the second lens block, the lens L[LS2o] and the second lens substrate are arranged in this order from the object side to the image side,
wherein an object-side lens surface of the lens L[LS1o] is convex to the object side, and
wherein an object-side lens surface of the lens L[LS2o] is concave to the object side.

14. The imaging lens according to claim 11,
wherein conditional formula (D8) below is fulfilled:

$$Ar/TL \leq 0.5 \qquad (D8)$$

where
  Ar represents a sum of aerial distances between adjacent lens blocks in the imaging lens (including a thickness of any optical element having no optical power other than a lens block, as given as an equivalent thickness in air); and
  TL represents a distance from a most object-side surface in the imaging lens to an imaging surface along the optical axis.

15. The imaging lens according to claim 12,
wherein said lens block comprises only three lens blocks, namely the first lens block, a second lens block, and a third lens block,
wherein, in the first lens block, the lens L[LS1o], the first lens substrate, and the lens L[LS1m] are arranged in this order from an object side to an image side,
wherein the second lens block is located to an image side of the first lens block and includes,
  as said lens substrate, a second lens substrate, and
  as said lens, a lens L[LS2o] contiguous with an object-side substrate surface of the second lens substrate,
wherein, the second lens block, the lens L[LS2o] and the second lens substrate are arranged in this order from the object side to the image side,
wherein the third lens block is located to an image side of the second lens block and includes,
  as said lens substrate, a third lens substrate, and
  as said lens, a lens L[LS3o] contiguous with an object-side substrate surface of the third lens substrate and a lens L[LS3m] contiguous with an image-side substrate surface of the third lens substrate,
wherein, in the third lens block, the lens L[LS3o], the third lens substrate, and the lens L[LS3m] are arranged in this order from the object side to the image side,
wherein an object-side lens surface of the lens L[LS1o] is convex to the object side,
wherein an object-side lens surface of the lens L[LS2o] is concave to the object side, and
wherein an object-side lens surface of the lens L[LS3o] and an image-side lens surface of the lens L[LS3m] are aspherical.

16. The imaging lens according to claim 12,
wherein said lens block comprises only four lens blocks, namely the first lens block, a second lens block, a third lens block, and a fourth lens block,
wherein, in the first lens block, the lens L[LS1o], the first lens substrate, and the lens L[LS1m] are arranged in this order from an object side to an image side,
wherein the second lens block is located to an image side of the first lens block and includes,
  as said lens substrate, a second lens substrate, and
  as said lens, a lens L[LS2o] contiguous with an object-side substrate surface of the second lens substrate and a lens L[LS2m] contiguous with an image-side substrate surface of the second lens substrate,
wherein, in the second lens block, the lens L[LS2o], the second lens substrate, and the lens L[LS2m] are arranged in this order from the object side to the image side,
wherein the third lens block is located to an image side of the second lens block and includes,
  as said lens substrate, a third lens substrate, and
  as said lens, a lens L[LS3m] contiguous with an image-side substrate surface of the third lens substrate,
wherein, in the third lens block, the third lens substrate and the lens L[LS3m] are arranged in this order from the object side to the image side,
wherein the fourth lens block is located to an image side of the third lens block and includes.
  as said lens substrate, a fourth lens substrate, and
  as said lens, a lens L[LS4o] contiguous with an object-side substrate surface of the fourth lens substrate and a lens L[LS4m] contiguous with an image-side substrate surface of the fourth lens substrate,
wherein, in the fourth lens block, the lens L[LS4o], the fourth lens substrate, and the lens L[LS4m] are arranged in this order from the object side to the image side,
wherein an object-side lens surface of the lens L[LS1o] is convex to the object side,
wherein an object-side lens surface of the lens L[LS2o] is concave to the object side,
wherein an image-side lens surface of the lens L[LS3m] is aspherical, and
wherein an object-side lens surface of the lens L[LS4o] and an image-side lens surface of the lens L[LS4m] are aspherical.

17. The imaging lens according to claim 15, wherein conditional formulae (D9) and (D10) are fulfilled:

$$TL/Y' \leq 2.06 \qquad (D9)$$

$$Ar/TL \leq 0.6 \qquad (D10)$$

where
  TL represents a distance from a most object-side surface in the imaging lens to an imaging surface along the optical axis;
  Y' represents an maximum image height; and
  Ar represents a sum of aerial distances between adjacent lens blocks in the imaging lens (including a thickness of any optical element having no optical power other than a lens block, as given as an equivalent thickness in air).

18. The imaging lens according to claim 1, wherein said lens is formed of resin, and wherein the resin of which the lens is formed has inorganic fine particles with a particle diameter of 30 nm or less dispersed therein.

19. A method of manufacturing the imaging lens according to claim 1, where a unit including, as each of the one to four lens blocks, a plurality of lens blocks arranged in an array is a lens unit block, said method comprising the steps of:
  a joining step of arranging a spacer at least at part of a peripheral edge of the lens blocks and joining the plurality of lens block units together with the spacer in between; and
  a cutting step of cutting the joined-together lens block units along the spacer.

* * * * *